US012591451B2

(12) United States Patent
Bai et al.

(10) Patent No.: US 12,591,451 B2
(45) Date of Patent: Mar. 31, 2026

(54) INTER-APPLICATION COMMUNICATION METHOD AND APPARATUS, STORAGE MEDIUM, AND PROGRAM PRODUCT

(71) Applicant: HUAWEI TECHNOLOGIES CO., LTD., Shenzhen (CN)

(72) Inventors: Weihua Bai, Beijing (CN); Wei Xiao, Shenzhen (CN); Xianping Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 18/902,735

(22) Filed: Sep. 30, 2024

(65) Prior Publication Data

US 2025/0028552 A1     Jan. 23, 2025

Related U.S. Application Data

(63) Continuation of application No. PCT/CN2023/081645, filed on Mar. 15, 2023.

(30) Foreign Application Priority Data

Mar. 29, 2022    (CN) .......................... 202210322866.9

(51) Int. Cl.
G06F 9/48        (2006.01)
G06F 9/54        (2006.01)

(52) U.S. Cl.
CPC .......... G06F 9/4812 (2013.01); G06F 9/4881 (2013.01); G06F 9/54 (2013.01)

(58) Field of Classification Search
None
See application file for complete search history.

(56) References Cited

U.S. PATENT DOCUMENTS 9,507,617 B1 * 11/2016  Wang .................. G06F 9/45558
9,639,395 B2 *  5/2017  Serebrin .............. G06F 9/5077
(Continued)

FOREIGN PATENT DOCUMENTS

EP         4589436 A1 *  7/2025  ............. G06F 9/541

OTHER PUBLICATIONS

Machine Translation of Chinese Patent Application CN 106648832 B, published 2020. (Year: 2020).*

(Continued)

*Primary Examiner* — Steven G Snyder

(57) ABSTRACT

This application relates to an inter-application communication method and apparatus, a storage medium, and a program product. The method is used in an electronic device. The electronic device runs a first virtual apparatus and a second virtual apparatus, one of the first virtual apparatus and the second virtual apparatus is a virtual machine, and the other is a physical machine. The method includes: the first virtual apparatus writes a first command into a first command queue based on a first request sent by a first application. The first virtual apparatus outputs a first inter-core interrupt to a core in which the second virtual apparatus is located. The second virtual apparatus obtains the first command from the first command queue based on the first inter-core interrupt. The second virtual apparatus runs a second application based on an identifier that is of the second application and that is in the first command.

20 Claims, 13 Drawing Sheets

(56) References Cited

U.S. PATENT DOCUMENTS

| | | | | |
|---|---|---|---|---|
| 9,747,122 | B2 * | 8/2017 | Serebrin | G06F 9/546 |
| 11,972,285 | B2 * | 4/2024 | Wu | G06F 9/4812 |
| 12,160,359 | B2 * | 12/2024 | Fujimoto | H04L 43/0852 |
| 2011/0179413 | A1 * | 7/2011 | Subramanian | G06F 9/45558 |
| | | | | 718/1 |
| 2012/0096206 | A1 * | 4/2012 | Talamacki | G06F 9/45558 |
| | | | | 718/1 |
| 2016/0306645 | A1 * | 10/2016 | Serebrin | G06F 9/45558 |
| 2016/0306658 | A1 * | 10/2016 | Serebrin | G06F 3/0647 |
| 2017/0185435 | A1 * | 6/2017 | Dewan | G06F 9/5077 |
| 2023/0029932 | A1 * | 2/2023 | Fujimoto | H04L 43/0852 |
| 2024/0129255 | A1 * | 4/2024 | Fujimoto | H04L 47/568 |
| 2024/0160468 | A1 * | 5/2024 | Fujimoto | G06F 9/545 |
| 2024/0333541 | A1 * | 10/2024 | Fujimoto | H04L 12/12 |
| 2025/0055779 | A1 * | 2/2025 | Fujimoto | H04L 41/40 |

OTHER PUBLICATIONS

Machine Translation of Chinese Patent Application CN 108196945 B, published 2022. (Year: 2022).*

Machine Translation of Chinese Patent Application CN 108845863 B, published 2022. (Year: 2022).*

Machine Translation of Chinese Patent Application CN 110858164 B, published 2020. (Year: 2020).*

Machine Translation of Chinese Patent Application CN 116149820 B, published 2024. (Year: 2024).*

Machine Translation of Japanese Patent Application JP WO2008108084 A1, published 2010. (Year: 2010).*

Machine Translation of Korean Patent Application KR 19980070053 A, published 1998. (Year: 1998).*

Machine Translation of Chinese Patent Application CN 117278640 A, published 2023. (Year: 2023).*

Machine Translation of Chinese Patent Application CN 103514043 B, published 2017. (Year: 2017).*

Machine Translation of Taiwan Patent Application TW 201518931 A, published 2015. (Year: 2015).*

Machine Translation of WIPO Publication WO 2024164622 A1, published 2024. (Year: 2024).*

Michael S. Tsirkin et al, Virtual I/O Device (VIRTIO) Version 1.1, Committee Specification Draft 01/Public Review Draft 01, Oasis, Dec. 20, 2018, total 121 pages.

* cited by examiner

INTER-APPLICATION COMMUNICATION METHOD AND APPARATUS, STORAGE MEDIUM, AND PROGRAM PRODUCT

CROSS-REFERENCE TO RELATED APPLICATIONS

This application is a continuation of International Application No. PCT/CN2023/081645, filed on Mar. 15, 2023, which claims priority to Chinese Patent Application No. 202210322866.9, filed on Mar. 29, 2022. The disclosures of the aforementioned applications are hereby incorporated by reference in their entireties.

TECHNICAL FIELD

This application relates to the communication field, and in particular, to an inter-application communication method and apparatus, a storage medium, and a program product.

BACKGROUND

With the development of software and hardware and the change of application scenarios, there is an increasing demand for an embedded system that supports simultaneous deployment of a plurality of operating systems. For example, in an intelligent vehicle, a same chip needs to run a plurality of completely different services, and these services have totally different requirements for computing resources and execution environments. For example, some services that are closely related to personal safety require an operating system to provide strong real-time performance, while a music media service needs an operating system to have high ecological compatibility, and has a very low requirement on real-time performance of the operating system. Implementation of these different requirements needs close cooperation of operating systems of the embedded system.

For different service requirements, the embedded system usually uses a virtualization technology to deploy a plurality of operating systems of different types, such as a real-time operating system, a control operating system, and a secure operating system. On a physical machine, a virtual machine monitor simultaneously manages and runs the foregoing plurality of operating systems, that is, runs a plurality of virtual machines, and runs different types of services on different virtual machines based on requirements. The physical machine is also referred to as a host machine, and the plurality of virtual machines run by the physical machine may be referred to as guest machines.

Based on characteristics of general virtualization, different virtual machines are isolated, and the different virtual machines and the physical machine are also isolated. However, for some scenarios or requirements, a service of the virtual machine and a service of the physical machine may need to communicate with each other.

SUMMARY

In view of this, an inter-application communication method and apparatus, a storage medium, and a program product are provided. According to the inter-application communication method in embodiments of this application, fast communication between a service of a virtual machine and a service of a physical machine can be implemented, and communication efficiency of an electronic device can be improved.

According to a first aspect, an embodiment of this application provides an inter-application communication method. The method is used in an electronic device. The electronic device includes a first virtual apparatus and a second virtual apparatus, one of the first virtual apparatus and the second virtual apparatus is a virtual machine, and the other is a physical machine. The method includes: the first virtual apparatus writes a first command into a first command queue based on a first request sent by a first application, where the first request and the first command include an identifier of a second application on the second virtual apparatus. The first virtual apparatus outputs a first inter-core interrupt to a core in which the second virtual apparatus is located, so that the second virtual apparatus is capable of obtaining the first inter-core interrupt. The second virtual apparatus obtains the first command from the first command queue based on the first inter-core interrupt. The second virtual apparatus runs the second application based on the identifier that is of the second application and that is in the first command.

According to the inter-application communication method in this embodiment of this application, the first virtual apparatus writes the first command into the first command queue based on the first request sent by the first application, and outputs the first inter-core interrupt to the core in which the second virtual apparatus is located so that the second virtual apparatus is capable of obtaining the first inter-core interrupt and obtaining, based on the first inter-core interrupt, the first command from the first command queue, thereby implementing communication between the first virtual apparatus and the second virtual apparatus. The first command is written based on the first request from the first application, and includes the identifier of the second application on the second virtual apparatus, so that the second virtual apparatus is capable of running the second application based on the identifier that is of the second application and that is in the first command, thereby implementing communication between the application of the first virtual apparatus and the application of the second virtual apparatus. One of the first virtual apparatus and the second virtual apparatus is the virtual machine, and the other is the physical machine. Therefore, communication between the physical machine and the virtual machine is completed by directly outputting an inter-core interrupt to a core in which an object that needs to be communicated with is located, so that a virtual interrupt controller can be avoided to be used, thereby avoiding virtual machine entry/exit, implementing fast communication between a service of the virtual machine and a service of the physical machine, and improving communication efficiency of the electronic device.

According to the first aspect, in a first implementation of the inter-application communication method, the first virtual apparatus further includes a first agent module. That the first virtual apparatus writes a first command into a first command queue based on a first request sent by a first application includes: the first agent module receives the first request sent by the first application. The first agent module writes the first command into the first command queue based on the first request. That the first virtual apparatus outputs a first inter-core interrupt to a core in which the second virtual apparatus is located includes: the first agent module outputs the first inter-core interrupt to the core in which the second virtual apparatus is located.

In this manner, the first agent module may be used to complete a part of work related to the first application, so as to avoid direct data exchange between the first application and the second virtual apparatus itself, thereby ensuring running security of the first application and reducing data processing costs of the first application.

According to the first aspect or the first implementation of the first aspect, in a second implementation of the inter-application communication method, the second virtual apparatus further includes a second agent module. That the second virtual apparatus obtains the first command from the first command queue based on the first inter-core interrupt includes: the second agent module obtains the first command from the first command queue based on the first inter-core interrupt. That the second virtual apparatus runs the second application based on the identifier that is of the second application and that is in the first command includes: the second agent module runs the second application based on the identifier that is of the second application and that is in the first command.

In this manner, the second agent module may be used to complete a part of work related to the second application so as to avoid direct data exchange between the second application and the first virtual apparatus itself, thereby ensuring running security of the second application and reducing data processing costs of the second application.

According to the first or the second implementation of the first aspect, in a third implementation of the inter-application communication method, the first request and the first command further include blocking information of the first application. After the first agent module receives the first request sent by the first application, the method further includes: the first application enters a blocked state. When receiving a second inter-core interrupt, the first agent module obtains a second command from a second command queue based on the second inter-core interrupt, where the second inter-core interrupt is generated after the second application finishes running. The first agent module releases the blocked state of the first application when the second command includes an identifier of the first application.

In this manner, for the first application that is blocked after the request for communication with the second application is sent, a quick notification from the second application to the first application may be implemented and the blocked state of the blocked first application may be released based on the notification, to ensure that the first application can continue to be run quickly.

According to the third implementation of the first aspect, in a fourth implementation of the inter-application communication method, after the second virtual apparatus runs the second application based on the identifier that is of the second application and that is in the first command, the method further includes: after the second application finishes running, the second agent module receives a second request sent by the second application, where the second request includes the identifier of the first application. The second agent module writes the second command into the second command queue based on the second request, where the second command includes the identifier of the first application. The second agent module outputs the second inter-core interrupt to a core in which the first virtual apparatus is located so that the first virtual apparatus is capable of obtaining the second inter-core interrupt.

In this manner, the second agent module may determine that the first application needs to be notified after the second agent module finishes running, and the first agent module may release the blocked state of the first application based on the second command to ensure that when the blocked state of the first application is released, the second application has indeed finished running, thereby meeting a requirement that the first application continues to be run after the second application finishes running.

According to any one of the first to the fourth implementations of the first aspect, in a fifth implementation of the inter-application communication method, that the first agent module writes the first command into the first command queue based on the first request includes: the first agent module determines, based on the first request, whether the second application has notification permission, and writes the first command into the first command queue when the second application has the notification permission.

In this manner, it can be ensured that an application that receives the notification is the application having the notification permission, thereby ensuring notification security.

According to any one of the third to the fifth implementations of the first aspect, in a sixth implementation of the inter-application communication method, before the first virtual apparatus writes the first command into the first command queue based on the first request sent by the first application, the method further includes: the first virtual apparatus creates a shared memory in response to an application of the first application, and the first agent module establishes an association relationship between an address of the first application and an address of the shared memory, where the first request and the first command further include a parameter of the shared memory. That the first agent module releases the blocked state of the first application when the second command includes an identifier of the first application includes: when the second command includes the identifier of the first application and information indicating that a channel is successfully established, the first agent module releases the blocked state of the first application.

In this manner, the shared memory may be used as a dedicated data channel between the first application and the second application. Compared with a solution in which data is transferred only in a form of the command queue, in this manner, richer data can be transferred. In addition, the shared memory can transfer a large amount of data. This reduces a number of data copy times and improves data transmission efficiency.

According to the sixth implementation of the first aspect, in a seventh implementation of the inter-application communication method, that the second agent module runs the second application based on the identifier that is of the second application and that is in the first command includes: the second agent module determines, based on the first command, whether the second application has permission to access the shared memory. The second agent module runs the second application and establishes an association relationship between an address of the second application and the address of the shared memory when the second application has the permission to access the shared memory, where the second command further includes information indicating that the channel is successfully established or that the channel fails to be established.

In this manner, before the dedicated data channel is established, the second agent module may determine whether the second application has the permission to access the shared memory. The dedicated data channel is established when the second application has the permission to access the shared memory, to ensure security of establishing the dedicated data channel. The information indicating that the channel is successfully established or that the channel fails to be established is transferred to the first virtual apparatus side based on the second command so that the first application of the first virtual apparatus may determine an execution status of the request of the first application.

According to the sixth or seventh implementation of the first aspect, in an eighth implementation of the inter-application communication method, the shared memory is further used as a control channel, the control channel includes a first data bit and a second data bit, and states of the first data bit and the second data bit are controlled by the first agent module and the second agent module. Before the first virtual apparatus outputs the first inter-core interrupt to the core in which the second virtual apparatus is located, the method further includes: the first agent module controls the first data bit to be in a set state and the second data bit to be in a non-set state. That the first agent module outputs the first inter-core interrupt to the core in which the second virtual apparatus is located includes: when the first agent module determines that the first data bit of the control channel between the first application and the second application is in the set state and the second data bit is in the non-set state, the first agent module outputs the first inter-core interrupt to the core in which the second virtual apparatus is located.

The control channel is dedicated to controlling sending and receiving of the inter-core interrupt, so that a number of receiving/sending times of the inter-core interrupt can be reduced, and implementation complexity of the inter-application communication method can be reduced.

According to the eighth implementation of the first aspect, in a ninth implementation of the inter-application communication method, that the second agent module obtains the first command from the first command queue based on the first inter-core interrupt includes: the second agent module traverses, based on the first inter-core interrupt, control channels associated with all applications corresponding to the second agent module on the second virtual apparatus. When determining that the first data bit of the control channel between the first application and the second application is in the set state, the second agent module obtains the first command from the first command queue.

The second agent module checks first data bits of the control channels associated with all the applications corresponding to the second agent module to determine that an application corresponding to which channel sends a request. The second agent module determines, based on the state of the first data bit, whether a command needs to be obtained, so that repeated obtaining of the command can be avoided, and working efficiency of the second agent module can be improved.

According to the eighth or the ninth implementation of the first aspect, in a tenth implementation of the inter-application communication method, after the second virtual apparatus runs the second application based on the identifier that is of the second application and that is in the first command, the method further includes: the second agent module controls the first data bit of the control channel between the first application and the second application to be in the non-set state and the second data bit to be in the non-set state. For the control channel between the first application and the second application, after the second application finishes running, when determining that the first data bit of the control channel is in the non-set state, the second agent module controls the second data bit of the control channel to be in the set state. When determining that the first data bit of the control channel is in the set state, the second agent module re-obtains a command from the first command queue and schedules, based on an identifier of the second application in the newly obtained command, the second application to be run.

In this manner, after the request of the control channel between the first application and the second application is processed completely, a new request subsequently initiated by the first application may continue to be processed, and the new request does not need to be processed after the inter-core interrupt is obtained first, thereby reducing the number of receiving/sending times of the inter-core interrupt, and reducing data transmission costs.

According to any one of the fifth to the tenth implementations of the first aspect, in an eleventh implementation of the inter-application communication method, when the first virtual apparatus is the physical machine and the second virtual apparatus is the virtual machine, the first virtual apparatus further includes an authentication module and a first process module. That the second agent module determines, based on the first command, whether the second application has permission to access the shared memory includes: the second agent module forwards the identifier that is of the second application and that is in the first command to the first process module on the first virtual apparatus. The first process module determines an authentication identifier corresponding to the identifier of the second application, and sends a permission information obtaining request to the authentication module, where the permission information obtaining request includes the authentication identifier. The first process module receives permission information of the second application from the authentication module, and transmits the permission information to the second agent module. The second agent module determines, based on the permission information of the second application, whether the second application has the permission to access the shared memory.

When the first virtual apparatus is the physical machine, the first process module may be used as an interface between the virtual machine side and the physical machine side so that related information of the application on the virtual machine side may be transmitted to the physical machine side via the first process module, and the authentication module on the physical machine side may be used to perform authentication on the application on the virtual machine side. The authentication module performs authentication so that data transmission security can be further improved.

According to a second aspect, an embodiment of this application provides an inter-application communication apparatus. The apparatus is used in an electronic device. The electronic device runs a first virtual apparatus and a second virtual apparatus, one of the first virtual apparatus and the second virtual apparatus is a virtual machine, and the other is a physical machine. The apparatus includes: the first virtual apparatus, configured to: write a first command into a first command queue based on a first request sent by a first application, where the first request and the first command include an identifier of a second application on the second virtual apparatus, and output a first inter-core interrupt to a core in which the second virtual apparatus is located so that the second virtual apparatus is capable of obtaining the first inter-core interrupt. The second virtual apparatus is configured to: obtain the first command from the first command queue based on the first inter-core interrupt and run the second application based on the identifier that is of the second application and that is in the first command.

According to the second aspect, in a first implementation of the inter-application communication apparatus, the first virtual apparatus further includes a first agent module. The first agent module is configured to: receive the first request sent by the first application, write the first command into the first command queue based on the first request, and output the first inter-core interrupt to the core in which the second virtual apparatus is located.

According to the second aspect or the first implementation of the second aspect, in a second implementation of the inter-application communication apparatus, the second virtual apparatus further includes a second agent module. The second agent module is configured to: obtain the first command from the first command queue based on the first inter-core interrupt, and run the second application based on the identifier that is of the second application and that is in the first command.

According to the first or the second implementation of the second aspect, in a third implementation of the inter-application communication apparatus, the first request and the first command further include blocking information of the first application. After the first agent module receives the first request sent by the first application, the first application enters a blocked state. When receiving a second inter-core interrupt, the first agent module is further configured to obtain a second command from a second command queue based on the second inter-core interrupt, where the second inter-core interrupt is generated after the second application finishes running. The first agent module is further configured to release the blocked state of the first application when the second command includes an identifier of the first application.

According to the third implementation of the second aspect, in a fourth implementation of the inter-application communication apparatus, after the second application finishes running, the second agent module is further configured to: receive a second request sent by the second application, where the second request includes the identifier of the first application, write the second command into the second command queue based on the second request, where the second command includes the identifier of the first application, and output the second inter-core interrupt to a core in which the first virtual apparatus is located, so that the first virtual apparatus is capable of obtaining the second inter-core interrupt.

According to any one of the first to the fourth implementations of the second aspect, in a fifth implementation of the inter-application communication apparatus, that the first agent module writes the first command into the first command queue based on the first request includes: the first agent module determines, based on the first request, whether the second application has notification permission, and writes the first command into the first command queue when the second application has the notification permission.

According to any one of the third to the fifth implementations of the second aspect, in a sixth implementation of the inter-application communication apparatus, the first virtual apparatus is further configured to create a shared memory in response to an application of the first application, and the first agent module is further configured to establish an association relationship between an address of the first application and an address of the shared memory, where the first request and the first command further include a parameter of the shared memory. That the first agent module releases the blocked state of the first application when the second command includes an identifier of the first application includes: when the second command includes the identifier of the first application and information indicating that a channel is successfully established, the first agent module releases the blocked state of the first application.

According to the sixth implementation of the second aspect, in a seventh implementation of the inter-application communication apparatus, that the second agent module runs the second application based on the identifier that is of the second application and that is in the first command includes: the second agent module determines, based on the first command, whether the second application has permission to access the shared memory. The second agent module runs the second application and establishes an association relationship between an address of the second application and the address of the shared memory when the second application has the permission to access the shared memory, where the second command further includes information indicating that the channel is successfully established or that the channel fails to be established.

According to the sixth or seventh implementation of the second aspect, in an eighth implementation of the inter-application communication apparatus, the shared memory is further used as a control channel, the control channel includes a first data bit and a second data bit, and states of the first data bit and the second data bit are controlled by the first agent module and the second agent module. The first agent module is further configured to control the first data bit to be in a set state and the second data bit to be in a non-set state. That the first agent module outputs the first inter-core interrupt to the core in which the second virtual apparatus is located includes: when the first agent module determines that the first data bit of the control channel between the first application and the second application is in the set state and the second data bit is in the non-set state, the first agent module outputs the first inter-core interrupt to the core in which the second virtual apparatus is located.

According to the eighth implementation of the second aspect, in a ninth implementation of the inter-application communication apparatus, that the second agent module obtains the first command from the first command queue based on the first inter-core interrupt includes: the second agent module traverses, based on the first inter-core interrupt, control channels associated with all applications corresponding to the second agent module on the second virtual apparatus. When determining that the first data bit of the control channel between the first application and the second application is in the set state, the second agent module obtains the first command from the first command queue.

According to the eighth or the ninth implementation of the second aspect, in a tenth implementation of the inter-application communication apparatus, the second agent module is further configured to control the first data bit of the control channel between the first application and the second application to be in the non-set state and the second data bit to be in the non-set state. For the control channel between the first application and the second application, after the second application finishes running, the second agent module is further configured to: when determining that the first data bit of the control channel is in the non-set state, control the second data bit of the control channel to be in the set state. The second agent module is further configured to: when determining that the first data bit of the control channel is in the set state, re-obtain a command from the first command queue and schedule, based on an identifier of the second application in the newly obtained command, the second application to be run.

According to any one of the fifth to the tenth implementations of the second aspect, in an eleventh implementation of the inter-application communication apparatus, when the first virtual apparatus is the physical machine and the second virtual apparatus is the virtual machine, the first virtual apparatus further includes an authentication module and a first process module. That the second agent module determines, based on the first command, whether the second application has permission to access the shared memory includes: the second agent module forwards the identifier that is of the second application and that is in the first command to the first process module on the first virtual apparatus. The first process module determines an authentication identifier corresponding to the identifier of the second application, and sends a permission information obtaining request to the authentication module, where the permission information obtaining request includes the authentication identifier. The first process module receives permission information of the second application from the authentication module and transmits the permission information to the second agent module. The second agent module determines, based on the permission information of the second application, whether the second application has the permission to access the shared memory.

According to a third aspect, an embodiment of this application provides an inter-application communication apparatus including a processor and a memory configured to store instructions executable by the processor. The processor is configured to implement the inter-application communication method according to the first aspect or one or more of the implementations of the first aspect when executing the instructions.

According to a fourth aspect, an embodiment of this application provides a non-volatile computer-readable storage medium storing computer program instructions. When the computer program instructions are executed by a processor, the inter-application communication method according to the first aspect or one or more of the plurality of implementations of the first aspect is implemented.

According to a fifth aspect, an embodiment of this application provides a computer program product, including computer-readable code or a non-volatile computer-readable storage medium carrying the computer-readable code. When the computer-readable code is run in an electronic device, a processor in the electronic device performs the inter-application communication method according to the first aspect or one or more of the implementations of the first aspect.

These aspects and other aspects of this application are more concise and more comprehensive in descriptions of the following embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

DESCRIPTION OF EMBODIMENTS

Figure 1:
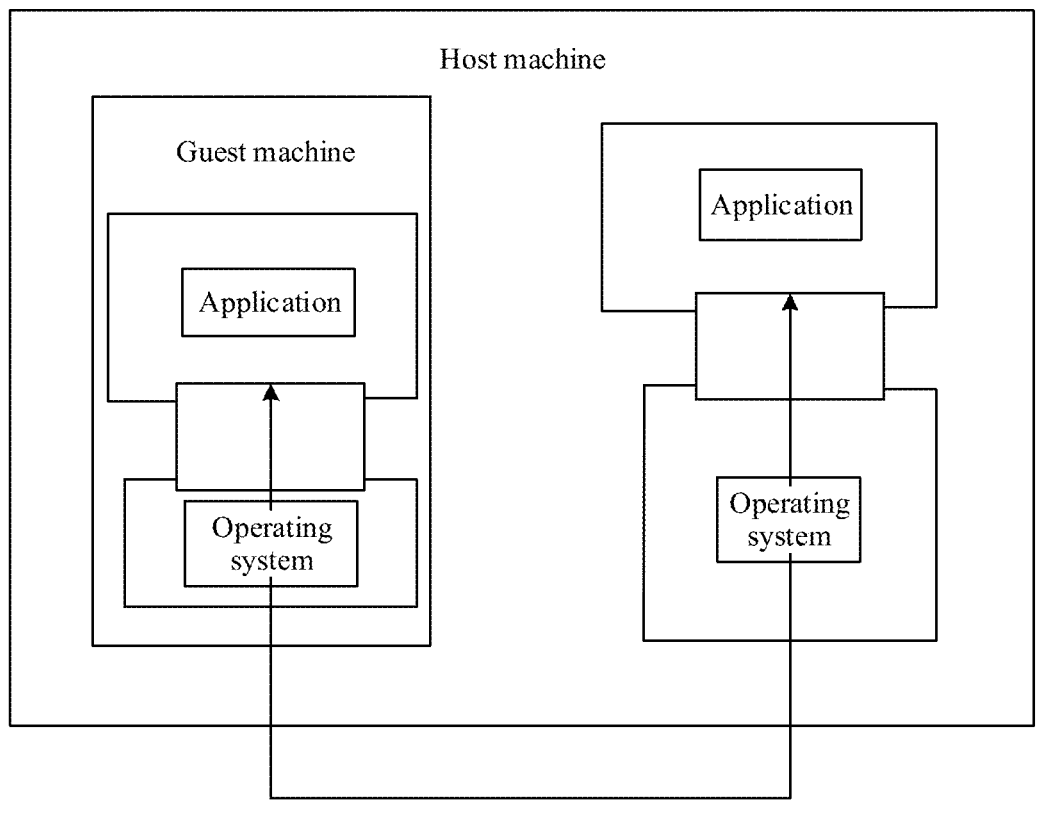
FIG. 1 is a diagram of a working procedure of a mutual communication solution based on a network posix interface in a conventional technology 2.

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The term "example" herein means "used as an example, embodiment or illustration". Any embodiment described as "example" is not necessarily explained as being superior or better than other embodiments.

In addition, to better describe this application, numerous details are given in the following implementations. A person skilled in the art should understand that this application can also be implemented without some details. In some instances, methods, means, elements and circuits that are well-known to a person skilled in the art are not described in detail, so that the subject matter of this application is highlighted.

The following describes the terms used in this specification.

Virtualization: is a technology that abstracts and reallocates real computer components and computing resources to establish one or more virtual environments, so that the computer components can run in the virtual environment. Abstracted objects include a processor, a memory, an input/output interface peripheral, and the like. The virtualization technology may simplify software reconfiguration, enables a plurality of instances to run on one platform at the same time, and enables all systems and applications to run in different spaces that do not interfere with each other.

Virtual machine (VM): an instance running in a virtual environment provided by virtualization is the virtual machine.

Real-time performance: is a capability of a task to be executed within a specific delay.

Embedded system: includes hardware and software, is an operating system embedded in an electronic/mechanical component of a non-general-purpose computer, and is usually miniaturized and has high real-time performance.

Virtual machine monitor (VMM): is software, firmware, or hardware, for example, a hypervisor, used to create and run a virtual machine.

Host machine: is also referred to as host OS or host for short. A system or machine that is used by a virtual machine monitor to run one or more virtual machines is referred to as the host machine.

Guest machine: is also referred to as guest OS or guest for short. A virtual machine running on a host machine is referred to as the guest machine.

Application (app): is a service that is run by a host machine or a guest machine, and can be considered as a program with a specific function.

Virtual machine exit (trap): a virtual machine switches, through a hardware capability, from a virtual environment to a physical environment for running, and can be passively exited due to an exception or interruption or actively exited based on a command.

Kernel mode: a processor switches to a privilege mode and can access all hardware resources, including a memory, an output/output interface, and computing resources. The kernel mode is responsible for managing allocation and use of the foregoing hardware resources by an application.

Virtual interrupt controller: is configured to receive interrupt requests from a plurality of external interrupt sources, determine priorities, select an interrupt request with a highest priority, and send the request to a processor.

Block: an application stops running because a resource is temporarily unavailable, and a blocked state can be released after the resource meets a requirement.

Privilege level: when a modern processor is running, software may run at different privilege levels. A higher privilege level usually has more permissions than a lower privilege level.

Driver: is a type of software running in an operating system (generally running at a high privilege level), and is used to operate behavior of a peripheral.

Front-end and back-end drivers: in a virtualization scenario, because real hardware can be managed only in a physical environment, only virtualized hardware can be viewed on a virtual machine. A driver of a virtual peripheral in the virtual machine is the front-end driver. Software that is responsible for simulating the virtual peripheral in the physical environment and requesting a real peripheral to perform an operation is generally referred to as the back-end driver.

Futex: is essentially an atomic variable used to perform synchronization between a plurality of objects. A common method is that one party is blocked on the futex and the other party wakes up the blocked party by adding 1 to a variable of the futex.

Stage 2 page table: because a virtual environment is virtualized from a physical environment, a physical address viewed on a virtual machine is not a real physical address. One page table needs to be used to translate and convert the physical address viewed on the virtual machine into the real physical address. This page table is maintained by software, and translation is automatically performed by hardware. This page table is referred to as the stage 2 page table on some platforms.

Hypercall: a virtual machine actively requests a service in a physical environment according to a hypercall instruction, and the hypercall instruction may carry a parameter.

Communication has two meanings. For two parties that need to communicate, a first meaning is to notify each other, for example, one party is blocked based on a mechanism and waits for the other party to communicate with the party in a manner to remind the party to continue to run; and a second meaning is to transfer message content, that is, two parties can transfer some data to each other through a channel while notifying each other. The data may be a request to the peer end, a response to the request, or data based on a protocol.

In a virtual machine scenario, in a general virtualization solution, isolation between a virtual machine and another external apparatus (for example, another virtual machine or physical machine) of the virtual machine is emphasized, and communication behavior between a bottom-layer virtual machine and the external is not emphasized. When information has to be transferred, the information can only be sent out through virtual machine exit, and then the bottom-layer virtual machine returns to continue to run. The virtual machine exit and return processes are slow, and information transfer efficiency is low. Therefore, when a performance bottleneck occurs, a fast and secure mechanism is required to enable an application on the physical machine side and an application on the virtual machine side to quickly communicate with each other.

In a conventional technology, the following two solutions are mainly used to implement communication between the application on the physical machine (host machine) side and the application on the virtual machine (guest machine) side.

A conventional technology 1 provides a synchronous shared memory mechanism, and a design origin of the solution is to resolve a problem of how to enable a driver in a virtual machine to use a real peripheral via a physical machine. This solution is implemented as follows.

When the guest machine wants to notify the host machine, data in the guest machine is transferred to the host machine via a shared memory, and an address of the shared memory is notified to the host machine based on a virtio transport protocol. When the host machine wants to notify the guest machine side, interrupt injection is generally used. When the host machine is scheduled, an interrupt is reported in the virtual machine, so that the guest machine has a chance to process a request from the host machine side.

The virtio protocol itself is used to resolve a problem of communication between a front-end driver and a back-end driver of the virtual machine, and is not a mechanism for communication between the application in the virtual machine and the application in the physical machine. The conventional technology 1 is improved based on this protocol, so that the mechanism can be used for communication between the application in the guest machine and the application in the host machine.

When the application on the host machine side wants to notify the application on the guest machine, the application on the host machine side may mark information about a to-be-notified application on the guest machine side in the shared memory, force a corresponding virtual machine to be exited, and then inject an interrupt into the virtual machine. When the application on the guest machine side wants to notify the application on the host machine side, the application on the guest machine side may also mark information about a to-be-notified application on the host machine side in the shared memory, actively perform virtual machine exit, and then notify the information about the to-be-notified application on the host machine side to the host machine side through an inter-core interrupt.

A disadvantage of the conventional technology 1 is that when communication is performed based on the virtio protocol, virtual machine exit is inevitably caused. On a physical machine of an arm 64 platform, both a notification sent by the host machine to the guest machine and a notification sent by the guest machine to the host machine involve virtual machine exit. Virtual machine entry/exit and subsequent context saving are slow procedures. This inevitably causes the performance bottleneck. In addition, the virtio protocol itself does not provide any security mechanism. When the applications on the host machine side and the guest machine side communicate with each other based on the virtio protocol, because there is no identity identification procedure, access to the shared memory is open to all. This inevitably causes security problems.

A conventional technology 2 provides a mutual communication solution based on a network posix interface. FIG. 1 is a diagram of a working procedure of a mutual communication solution based on a network posix interface in a conventional technology 2.

As shown in FIG. 1, a principle of the solution is that, as long as a host machine provides a network for a virtual machine, an application in the virtual machine may also be connected to the network through a network programming interface, and acts as a common application to use the network. Therefore, if both an application on the host machine side and an application on the guest machine side use networks through posix network programming interfaces, and other manners, the application on the host machine side and the application on the guest machine side may communicate with each other. To improve network usage performance of the guest machine, a network interface card passthrough mode is used. A network interface card interrupt generated in this mode can be directly injected to the virtual machine, and the guest machine does not need to be entered/exited when using the network interface card.

Although the conventional technology 2 is free from virtual machine entry/exit, some problems also exist. First, data transmission efficiency of a network protocol is very low, and therefore data is copied for a plurality of times. If an amount of data transmitted during communication is large, a communication delay is greatly increased. Second, even if the network interface card passthrough mode is used to improve the network performance, network interface card passthrough depends on a strict hardware environment. Therefore, network interface card passthrough means high hardware costs. In a scenario in which passthrough is not supported or no passthrough network interface card is available, use of the network interface card also causes virtual machine entry/exit and deteriorates the performance.

In view of this, an inter-application communication method and apparatus, a storage medium, and a program product are provided. According to the inter-application communication method in embodiments of this application, fast communication between a service of a virtual machine and a service of a physical machine can be implemented, and communication efficiency of an electronic device can be improved.

Figure 2:
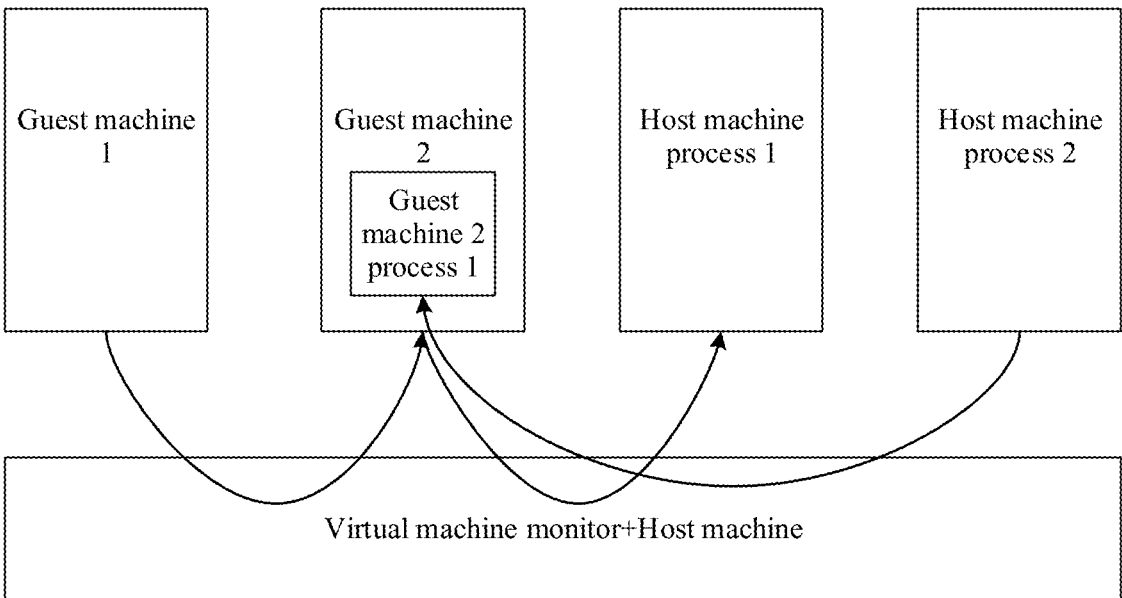
FIG. 2 shows an example application scenario of an inter-application communication method according to an embodiment of this application.

FIG. 2 shows an example application scenario of an inter-application communication method according to an embodiment of this application.

As shown in FIG. 2, the inter-application communication method in this embodiment of this application may be used in an electronic device. The electronic device in this application may be a smartphone, a netbook, a tablet computer, a notebook computer, a wearable electronic device (such as a smart band or a smartwatch), a TV, a virtual reality device, or the like.

The electronic device may include a virtual machine monitor and a host machine. The host machine may run a host machine side process 1 and a host machine side process 2, and may run a guest machine 1 and a guest machine 2 via the virtual machine monitor. The guest machine 2 may also run a guest machine 2 process 1.

The inter-application communication method in this embodiment of this application may provide a fast communication service between a first virtual apparatus and a second virtual apparatus, and provide a fast communication service between a first application on the first virtual apparatus and a second application on the second virtual apparatus. The first virtual apparatus may be a physical machine (the host machine), and the second virtual apparatus may be a virtual machine (the guest machine 1 or the guest machine 2). The first application may correspond to the host machine side process 1 or the host machine side process 2, and the second application may correspond to the guest machine 2 process 1.

In a running process of the first application (or the second application), a corresponding function of the second application (or the first application) may need to be run for cooperation. In this case, the first application (or the second application) may initiate a communication request to the second application (or the first application). The sent request may be carried in a command queue (not shown) corresponding to the second virtual apparatus (or the first virtual apparatus). The first virtual apparatus (or the second virtual apparatus) may send an inter-core interrupt to notify the second virtual apparatus (or the first virtual apparatus) of information that the request has been sent. The second virtual apparatus (or the first virtual apparatus) may obtain, based on the inter-core interrupt, the request carried in the command queue, and drive the second application on the second virtual apparatus to respond to the request. In this way, fast communication between the first application and the second application is implemented.

In FIG. 2, an example in which the first virtual apparatus is the physical machine and the second virtual apparatus is the virtual machine is used. A person skilled in the art should understand that the first virtual apparatus may also be the virtual machine, and the second virtual apparatus may also be the host machine. Types of the first virtual apparatus and the second virtual apparatus are not limited in this embodiment of this application.

Figure 3:
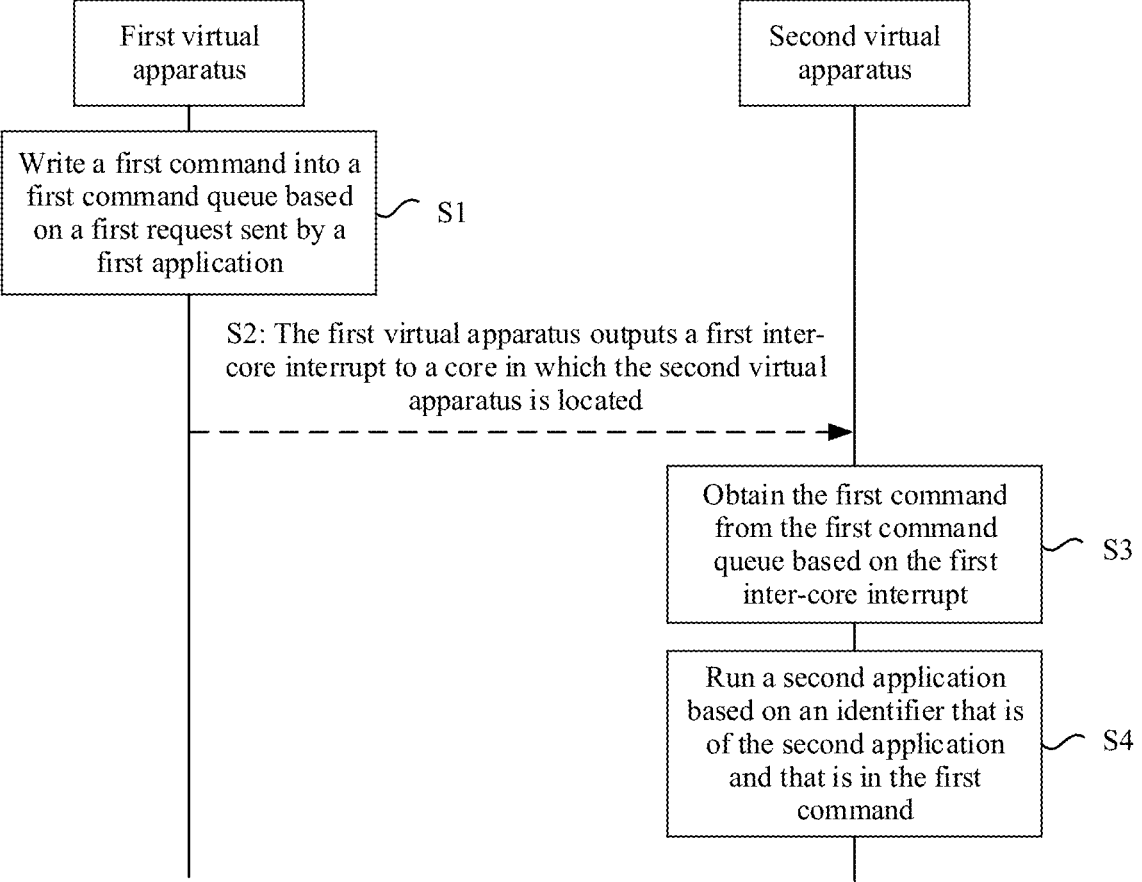
FIG. 3 is a flowchart of an example of an inter-application communication method according to an embodiment of this application.

FIG. 3 is a flowchart of an example of an inter-application communication method according to an embodiment of this application.

As shown in FIG. 3, in an implementation, this application provides an inter-application communication method. The method is used in an electronic device. The electronic device runs a first virtual apparatus and a second virtual apparatus, one of the first virtual apparatus and the second virtual apparatus is a virtual machine, and the other is a physical machine. The method includes step S1 to step S4.

S1: The first virtual apparatus writes a first command into a first command queue based on a first request sent by a first application, where the first request and the first command include an identifier of a second application on the second virtual apparatus.

The first application may be an application on the first virtual apparatus, and the first request may be a request from the first application for communication with the second application on the second virtual apparatus. The first command queue may be a static shared memory that is initialized when the electronic device is started and that can be accessed by the second virtual apparatus. The first command may be stored in the first command queue, and waits for the second virtual apparatus to obtain and process. Optionally, the first request and the first command may further include information indicating a running manner of the second application.

S2: The first virtual apparatus outputs a first inter-core interrupt to a core in which the second virtual apparatus is located, so that the second virtual apparatus is capable of obtaining the first inter-core interrupt.

An inter-core interrupt is directly output to a core in which an object that needs to be communicated with is located. Therefore, it is allowed to implement mutual notification between the physical machine and the virtual machine and between applications of different virtual machines without using a virtual interrupt controller. When the first virtual apparatus outputs the first inter-core interrupt to the second virtual apparatus, it may be considered as that communication from the first virtual apparatus to the second virtual apparatus is performed. When the second virtual apparatus obtains the first inter-core interrupt, it may be considered that communication from the first virtual apparatus to the second virtual apparatus is completed.

S3: The second virtual apparatus obtains the first command from the first command queue based on the first inter-core interrupt.

When the second virtual apparatus receives the inter-core interrupt, it may be considered that a new command is written into the first command queue, and the newly written command needs to be processed by the second virtual apparatus. Therefore, the second virtual apparatus may obtain the first command from the first command queue based on the first inter-core interrupt.

S4: The second virtual apparatus runs the second application based on the identifier that is of the second application and that is in the first command.

The second virtual apparatus may consider that an application (corresponding to the identifier included in the first command) is an application that needs to be run. The first command includes the identifier of the second application. Therefore, the second virtual apparatus may determine, based on the first command, that the second application needs to be run. When the first command includes the information indicating the running manner of the second application, the second virtual apparatus may run the second application according to an indication of the first command. In this case, it may be considered that the second virtual apparatus completes a corresponding response based on the communication.

According to the inter-application communication method in this embodiment of this application, the first virtual apparatus writes the first command into the first command queue based on the first request sent by the first application, and outputs the first inter-core interrupt to the core in which the second virtual apparatus is located, so that the second virtual apparatus is capable of obtaining the first inter-core interrupt and obtaining, based on the first inter-core interrupt, the first command from the first command queue, thereby implementing communication between the first virtual apparatus and the second virtual apparatus. The first command is written based on the first request from the first application, and includes the identifier of the second application on the second virtual apparatus, so that the second virtual apparatus is capable of running the second application based on the identifier that is of the second application and that is in the first command, thereby implementing communication between the application of the first virtual apparatus and the application of the second virtual apparatus. One of the first virtual apparatus and the second virtual apparatus is the virtual machine, and the other is the physical machine. Therefore, communication between the physical machine and the virtual machine is completed by directly outputting an inter-core interrupt to a core in which an object that needs to be communicated with is located, so that a virtual interrupt controller can be avoided to be used, thereby avoiding virtual machine entry/exit, implementing fast communication between a service of the virtual machine and a service of the physical machine, and improving communication efficiency of the electronic device.

Figure 4:
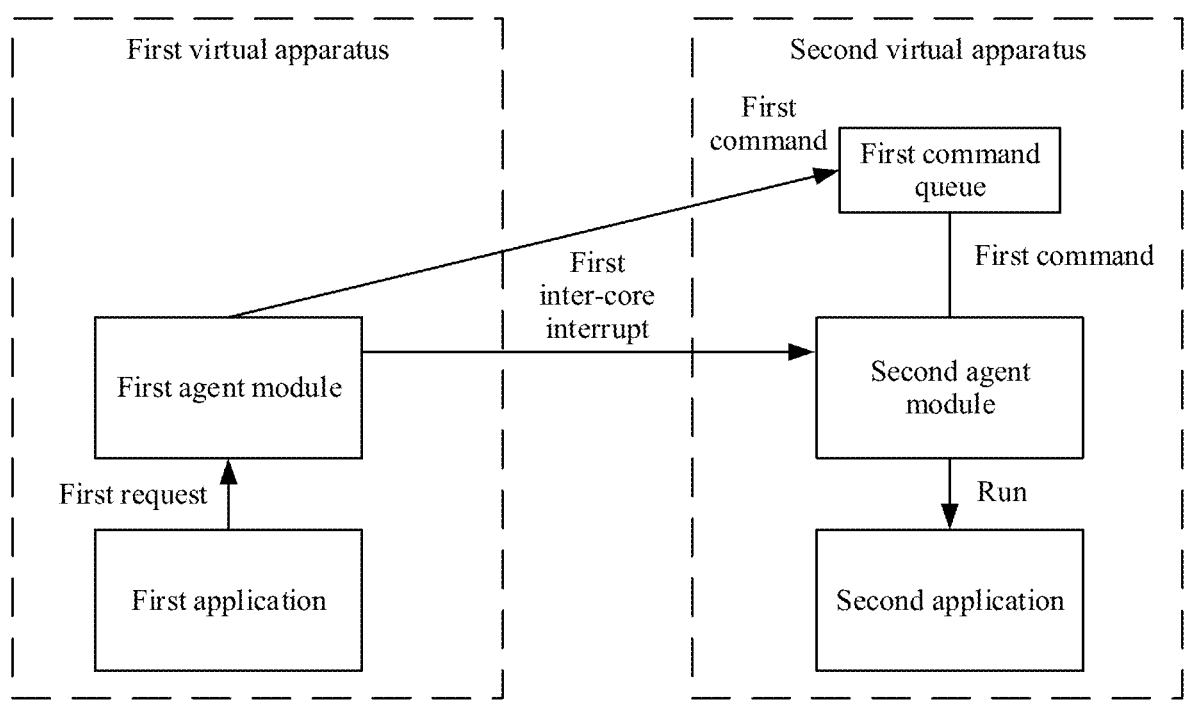
FIG. 4 is a diagram of an example method in which a first application notifies a second application according to an embodiment of this application.

FIG. 4 is a diagram of an example method in which a first application notifies a second application according to an embodiment of this application.

As shown in FIG. 4, in an implementation, the first virtual apparatus further includes a first agent module, and step S1 includes:

the first agent module receives the first request sent by the first application; and the first agent module writes the first command into the first command queue based on the first request; and step S2 includes:

the first agent module outputs the first inter-core interrupt to the core in which the second virtual apparatus is located.

In this manner, the first agent module may be used to complete a part of work related to the first application, so as to avoid direct data exchange between the first application and the second virtual apparatus itself, thereby ensuring running security of the first application, and reducing data processing costs of the first application.

For example, the first virtual apparatus may include at least one application, and the at least one application may correspond to one first agent module. The first agent module may be an agent entity that is introduced for security consideration or for implementing computer resource management, run at a higher permission level, and may be similar to a kernel mode in a Linux kernel. The first agent module may be responsible for managing and monitoring an application running on the first virtual apparatus at a lower permission level, releasing a blocked state of a blocked application (for example, refer to FIG. 6) on the first virtual apparatus, and the like. The at least one application may be entities that communicate with each other. In this embodiment of this application, the at least one application may send, to the first agent module in a form of a request, a desired thing to be done, to request the first agent module for help. In response to the request, the first agent module can perform operations such as inter-core interrupt receiving/sending, and command queue writing. Therefore, in a process in which the first agent module manages the first application, the first agent module may assist in events such as authentication (for example, refer to FIG. 10*a* and FIG. 10*b* below) and a memory mapping (for example, refer to FIG. 7 below) of the first application.

In step S1, the first request sent by the first application may be received by the first agent module. When the first request is a request that is initiated by the first application and that is for communication with the second application on the second virtual apparatus, the first request may include the identifier of the second application.

That the first virtual apparatus writes a first command into a first command queue based on a first request sent by a first application may be that the first agent module writes the first command into the first command queue based on the first request. As the first command corresponding to the first request, when the first request includes the identifier of the second application, the first command may also include the identifier of the second application.

When the first virtual apparatus expects to send the first request to the second virtual apparatus, the first virtual apparatus may write, based on the first command queue, the first command corresponding to the first request into the first command queue in a preset format (for example, [command type, command parameter]). In addition to being accessible to the first agent module, the first command queue may be set to be accessible to an agent module (for example, the second agent module described below) of the application on the second virtual apparatus.

The first inter-core interrupt may also be generated by the first agent module. In step S2, that the first virtual apparatus outputs a first inter-core interrupt to a core in which the second virtual apparatus is located may be that the first agent module outputs the first inter-core interrupt to the core in which the second virtual apparatus is located, so that the first virtual apparatus notifies the second virtual apparatus.

If running of the first application needs cooperation of the second application, when the first application does not need to wait until the second application finishes running before continuing to be run, that is, does not need to be blocked, the first application may continue to be run after sending the first request, and does not enter a blocked state. In this case, after the second application finishes running, the first application may not be notified.

The following describes a principle of implementing notification between the first virtual apparatus and the second virtual apparatus through first inter-core interrupt sending and receiving in this embodiment of this application.

To meet a high performance requirement, both the host machine and the guest machine need to directly send inter-core interrupts to each other when communicating with each other, and the guest machine does not need to be entered/exited in this procedure. However, on an arm platform, if the virtual interrupt controller (vgic) is enabled to implement interrupt sending, the guest machine needs to be exited theoretically when the guest machine wants to send an interrupt to notify the host machine and when the host machine sends an interrupt to notify the guest machine.

Based on this, the inter-application communication method in this embodiment of this application can implement inter-core interrupt receiving/sending when the virtual interrupt controller is disabled. Because the virtual interrupt controller is disabled, both an inter-core interrupt sent by the first virtual apparatus side and an inter-core interrupt sent by the second virtual apparatus side may be directly sent to an entity that is running when the inter-core interrupt is received. The following uses an example in which the first virtual apparatus is used as the entity to receive the inter-core interrupt for description.

Figure 5A:
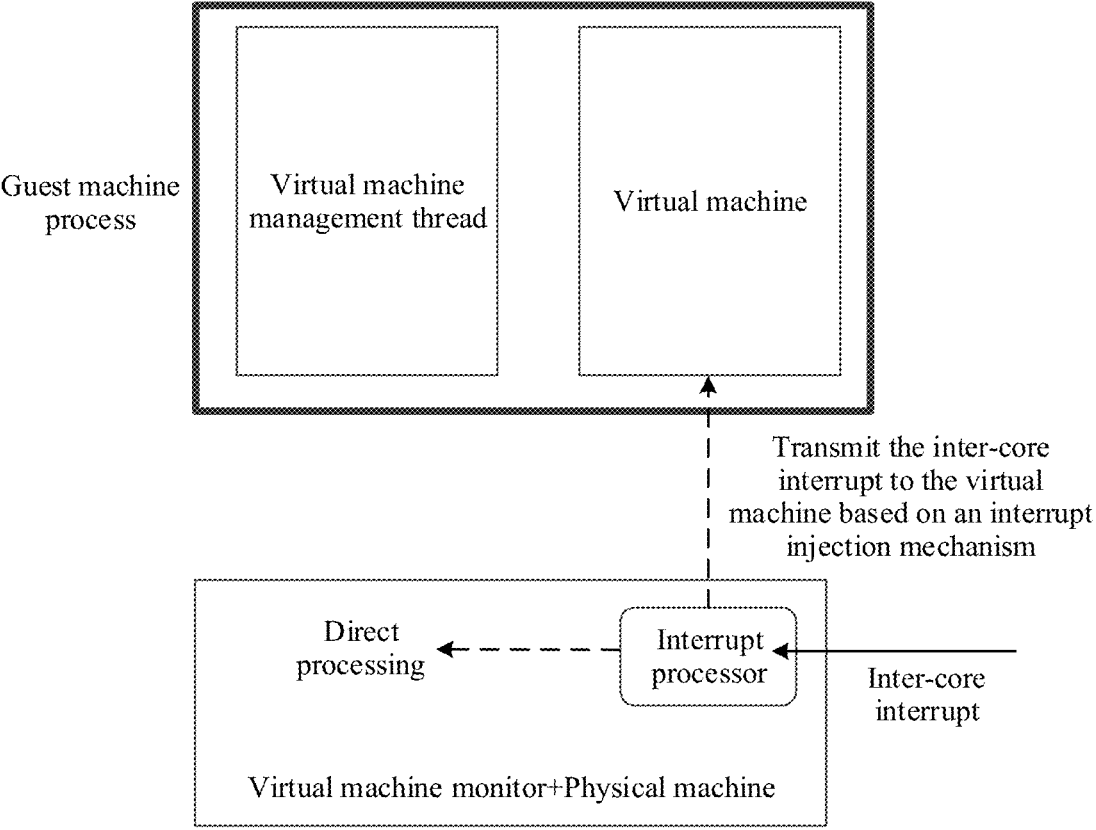
FIG. 5a shows an example in which a first virtual apparatus is used as an entity to receive an inter-core interrupt according to an embodiment of this application.

FIG. 5a shows an example in which a first virtual apparatus is used as an entity to receive an inter-core interrupt according to an embodiment of this application.

As shown in FIG. 5a, it is assumed that the first virtual apparatus is used as a physical machine, the physical machine is further configured to run at least one virtual machine and a virtual machine management thread (guest machine process) corresponding to the virtual machine, and the physical machine is on a core of an electronic device. When the physical machine is running, the physical machine receives an inter-core interrupt. If the inter-core interrupt is sent by another core of the electronic device to the physical machine, the inter-core interrupt may be received and processed by the physical machine. If the inter-core interrupt is sent to a virtual machine running on the physical machine, the physical machine may inject the inter-core interrupt to the corresponding virtual machine via an interrupt processor, and the virtual machine processes the inter-core interrupt. An injection manner may be implemented through the conventional technology. For example, when injection is performed through hardware, a register (not shown) on a virtual interrupt controller may be written. For another example, when injection is performed through software, a register context of the virtual machine may be changed. A manner in which the physical machine injects the inter-core interrupt into the corresponding virtual machine is not limited in this application.

Figure 5B:
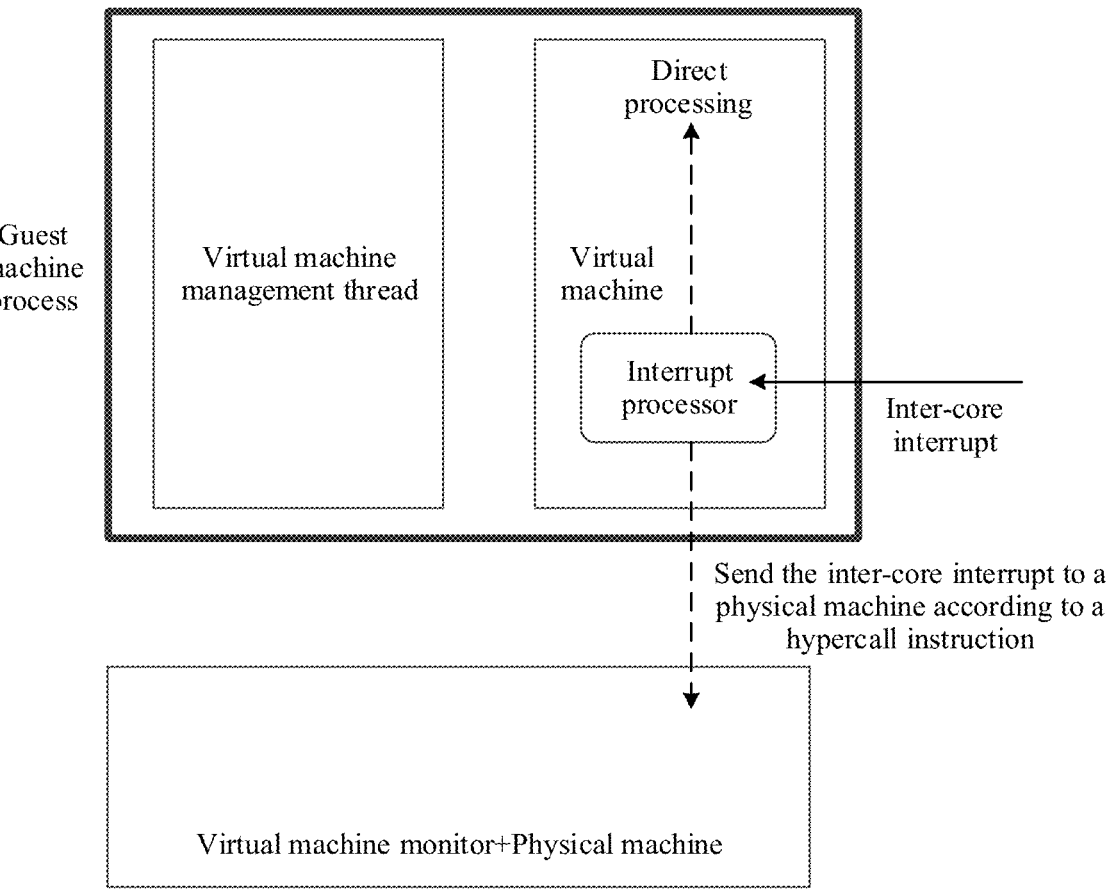
FIG. 5b shows another example in which a first virtual apparatus is used as an entity to receive an inter-core interrupt according to an embodiment of this application.

FIG. 5b shows another example in which a first virtual apparatus is used as an entity to receive an inter-core interrupt according to an embodiment of this application.

As shown in FIG. 5b, it is assumed that the first virtual apparatus is used as a virtual machine, the virtual machine runs on a physical machine, the physical machine further runs a virtual machine management thread (guest machine process) corresponding to the virtual machine, and the physical machine is disposed on a core of an electronic device. When is running, the virtual machine receives an inter-core interrupt. If the inter-core interrupt is sent by another core of the electronic device to the virtual machine, the inter-core interrupt may be received by the virtual machine, and may be directly processed by the virtual machine. If the inter-core interrupt is sent to a physical machine running the virtual machine, the virtual machine may send a hypercall instruction via an interrupt processor, to send the interrupt to the physical machine. The physical machine may actively process the interrupt according to the hypercall instruction.

With reference to related descriptions in FIG. 5a and FIG. 5b, it can be learned that, for a running virtual machine, an exit action is not required when an inter-core interrupt sent to the running virtual machine is received. In addition, because the virtual interrupt controller is disabled, the virtual machine may also directly send the inter-core interrupt to a core in which the physical machine is located. In this manner, the inter-core interrupt can be sent between the physical machine and the virtual machine when the virtual interrupt controller is disabled, and the virtual machine does not need to be entered/exited, thereby implementing direct notification of the interrupt between the virtual machine and the physical machine.

As shown in FIG. 4, in an implementation, the second virtual apparatus further includes a second agent module, and step S3 includes:

the second agent module obtains the first command from the first command queue based on the first inter-core interrupt; and step S4 includes:

the second agent module runs the second application based on the identifier that is of the second application and that is in the first command.

In this manner, the second agent module may be used to complete a part of work related to the second application, so as to avoid direct data exchange between the second application and the first virtual apparatus itself, thereby ensuring running security of the second application, and reducing data processing costs of the second application.

For example, the second virtual apparatus may include at least one application, and the at least one application may correspond to one second agent module. Similar to the first agent module, the second agent module may also be an agent entity that is introduced for security consideration or for implementing computer resource management, run at a higher permission level, and may be similar to a kernel mode in a Linux kernel. The second agent module may be responsible for managing and monitoring an application running on the second virtual apparatus at a lower permission level, releasing a blocked state of a blocked application on the second virtual apparatus, and the like. The at least one application may be entities that communicate with each other. In this embodiment of this application, the at least one application may send, to the second agent module in a form of a request, a desired thing to be done, to request the second agent module for help. In response to the request, the second agent module can perform operations such as inter-core interrupt receiving/sending, and command queue writing. Therefore, in a process in which the second agent module manages the second application, the first agent module may assist in events such as authentication (for example, refer to FIG. 10a and FIG. 10b below) and a memory mapping (for example, refer to FIG. 7 below) of the second application. Based on the introduction of the first agent module and the second agent module, the application on the first virtual apparatus side and the application on the second virtual apparatus side can communicate with each other.

In step S3, the second agent module may obtain the first command by accessing the first command queue. In other words, the first command queue may be set to be accessible only to the second agent module and the first agent module, and invisible to other entities.

Refer to the foregoing description. The first command may include the identifier of the second application. In step S4, the second agent module may determine, based on the identifier, that the application corresponding to the identifier, that is, the second application, is the application that needs to be run, and run the second application. It is equivalent to that the second application receives a notification from the first application and responds. In addition, this notification process does not need virtual machine entry/exit, thereby implementing quick notification of the applications between the virtual machine and the physical machine.

Figure 6:
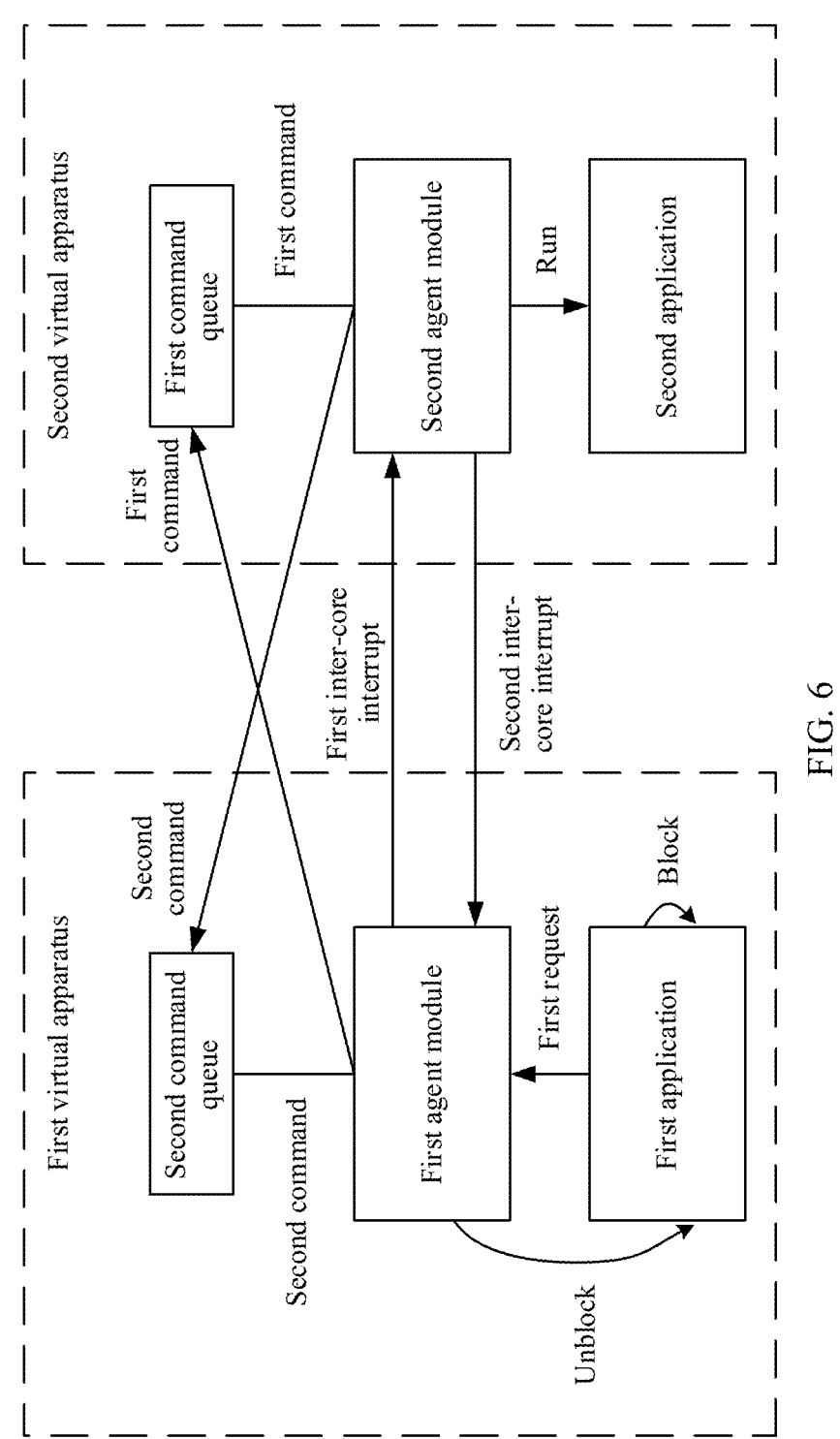
FIG. 6 is a diagram of an example method in which a notification of a second application is received after a first application notifies the second application according to an embodiment of this application.

FIG. 6 is a diagram of an example method in which a notification of a second application is received after a first application notifies the second application according to an embodiment of this application.

As shown in FIG. 6, in an implementation, the first request and the first command further include blocking information of the first application.

After the first agent module receives the first request sent by the first application, the method further includes:

the first application enters a blocked state;

when receiving a second inter-core interrupt, the first agent module obtains a second command from a second command queue based on the second inter-core interrupt, where the second inter-core interrupt is generated after the second application finishes running; and the first agent module releases the blocked state of the first application when the second command includes an identifier of the first application.

In this manner, for the first application that is blocked after the request for communication with the second application is sent, a quick notification from the second application may be implemented, and the blocked state of the blocked first application may be released based on the notification, to ensure that the first application can continue to be run quickly.

For example, if running of the first application needs cooperation of the second application, and the first application can continue to be run only after the second application finishes running, the first application may send the first request including the blocking information of the first application. The blocking information may be an instruction for instructing an application to enter a blocked state. The blocking information of the first application may be an instruction for instructing the first application to enter the blocked state. After sending the first request, the first application may be blocked on a corresponding futex (not shown), that is, enter the blocked state. In the blocked state, the first application may continue to be run after receiving the notification from the second application.

In step S1, after receiving the first request sent by the first application, the first agent module writes the first command into the first command queue, where the first command may also include the blocking information of the first application. In other words, the first request and the first command may include both the identifier of the first application and the blocking information of the first application. With reference to the foregoing description, it can be learned that the first command may be obtained by the second agent module, and the second application is run based on the identifier in the first command. After the second application finishes running, the second application may reversely notify the first application based on the blocking information of the first application. A notification manner of the second application may be the same as a manner in which the first application notifies the second application. For example, the second application sends a second request, and the second request may include the identifier of the first application. The second agent module writes the second command into the second command queue based on the second request, and sends the second inter-core interrupt to a core in which the first virtual apparatus is located, where the second command may include the identifier of the first application. For a notification manner, refer to related descriptions in FIG. 6 in the following. For the first virtual apparatus side, it may be embodied as follows: when the first virtual apparatus receives the second inter-core interrupt, the first agent module obtains the second command from the second command queue based on the second inter-core interrupt. The first agent module releases the blocked state of the first application based on the identifier of the first application included in the second command. In this case, the first application may continue to be run. For a manner of receiving the second inter-core interrupt, refer to the foregoing descriptions and related descriptions in FIG. 5a and FIG. 5b. Details are not described herein again.

Further, when the first agent module acts as an agent for a plurality of applications, if the first application can continue to be run only after the second application finishes running, the first request and the first command may further include the identifier of the first application. In other words, the first request and the first command may include all the identifier of the first application, the identifier of the second application, and the blocking information of the first application. Therefore, after determining, based on the identifier of the first application in the first command, that the second application finishes running, the second agent module may further determine that the second application should notify the first application in the plurality applications for which the first agent module acts as the agent, so as to ensure that the first application can quickly recover to a normal running state.

As shown in FIG. 6, in an implementation, after the second virtual apparatus runs the second application based on the identifier that is of the second application and that is in the first command, the method further includes:

after the second application finishes running, the second agent module receives a second request sent by the second application, where the second request includes the identifier of the first application;

the second agent module writes the second command into the second command queue based on the second request, where the second command includes the identifier of the first application; and the second agent module outputs the second inter-core interrupt to a core in which the first virtual apparatus is located, so that the first virtual apparatus is capable of obtaining the second inter-core interrupt.

In this manner, the second agent module may determine that the first application needs to be notified after the second agent module finishes running, and the first agent module may release the blocked state of the first application based on the second command, to ensure that when the blocked state of the first application is released, the second application has indeed finished running, thereby meeting a requirement that the first application continues to be run after the second application finishes running.

For example, if the first command includes the blocking information of the first application, the second agent module may determine, based on the first command, that the first application is already in the blocked state, and the notification that the second application finishes running needs to be waited for releasing the blocked state. In this case, after running of the second application scheduled by the second agent module ends, the second application may send the second request. Because the second application is run based on the notification of the first application, the second request may include the identifier of the first application.

The second agent module may write the second command into the second command queue based on the second request. As the second command corresponding to the second request, when the second request includes the identifier of the first application, the second command may also include the identifier of the first application. Optionally, the second request and the second command may further include information indicating a running manner of the first application.

The second command queue may be a static shared memory that is between the first virtual apparatus and the second virtual apparatus and that is initialized when the first virtual apparatus is started. When the second virtual apparatus expects to send the second request to the first virtual apparatus, the second virtual apparatus may write, based on the second command queue, the second command corresponding to the second request into the second command queue in a preset format (for example, [command type, command parameter]). The second command queue may be set to be accessible to some modules (for example, the first agent module described above) on the first virtual apparatus.

After writing the second command into the second command queue, the second agent module may output the second inter-core interrupt to the core in which the first virtual apparatus is located, so that the second virtual apparatus notifies the first virtual apparatus. For a manner of outputting the second inter-core interrupt, refer to the foregoing descriptions and related descriptions in FIG. 5*a* and FIG. 5*b*. Details are not described herein again.

Further, when the second agent module acts as an agent for a plurality of applications, if the first application can continue to be run only after the second application finishes running, the second request and the second command may further include the identifier of the second application. In other words, the second request and the second command may include both the identifier of the first application and the identifier of the second application. Therefore, the second agent module may determine, based on the identifier of the second application in the second request, that the second application in the plurality of applications for which the second agent module acts as the agent finishes running, so as to perform the step of writing the second command into the second command queue based on the second request. In addition, the first agent module may determine, based on the identifier of the second application and the identifier of the first application in the second command, that the request that is initiated by the first application and that is for communication between the first application and the second application on the second virtual apparatus has been processed completely, and the second application finishes running in response to the request, and then the blocked state of the first application is released. It is ensured that when the first application returns to a normal running state after the blocked state is released, the second application has indeed finished running.

The identifier of the first application may be applied by the first application from an agent, that is, the first agent module, of the first application, for identity identification and blocked state releasing. The first agent module may associate the identifier of the first application with any futex (not shown), so that the first application can be blocked on the corresponding futex. Similarly, the identifier of the second application may be applied by the second application from an agent, that is, the second agent module, of the second application, for identity identification and blocked state releasing. The second agent module may associate the identifier of the second application with any futex (which is not shown and is different from the futex corresponding to the first application), so that the second application can be blocked on the corresponding futex.

The foregoing shows only an example in which the first application is blocked. A person skilled in the art should understand that, when running of the second application needs cooperation of a corresponding application of a physical machine other than the second virtual apparatus, if the second application can continue to be run only after the corresponding application finishes running, the second application may also be blocked on a futex associated with the second application by the second agent module. For a blocking manner and a blocked state releasing manner, refer to the related descriptions of the blocking manner and the blocked state releasing manner of the first application. Details are not described herein again.

In an implementation, that the first agent module writes the first command into the first command queue based on the first request includes:

the first agent module determines, based on the first request, whether the second application has notification permission; and writes the first command into the first command queue when the second application has the notification permission.

In this manner, it can be ensured that an application that receives the notification is the application having the notification permission, thereby ensuring notification security.

For example, in some application scenarios, for example, a microkernel scenario, there may be a requirement for permission of applications that communicate with each other, and authentication needs to be performed on the applications to ensure communication security. Therefore, before writing the first command into the first command queue, the first agent module may determine permission of the second application. The first request may include the identifier of the second application. Therefore, the first agent module may determine, based on the first request, that the second application is an application that the first application wants to request to run (notify). In this case, the first agent module may first determine whether the second application has the notification permission. When the second application has the notification permission, it may be considered that the second application is an object that can be communicated with, and then the first command is written into the first command queue. If the second application does not have the notification permission, it may be considered that the second application is not the object that can be communicated with, and the first command may not be written into the first command queue.

The notification permission may be directly determined by the first agent module on the first virtual apparatus. For example, for each application for which the second agent module acts an agent, when preparing to use the inter-application communication method in this embodiment of this application for communication, the application may apply to the second agent module for a corresponding identifier, for identity identification and blocked state releasing. When an application applies for an identifier, the application may be authorized once. The second application for which the second agent module acts an agent is used as an example. After the second application applies to the second agent module for an identifier, for example, the second agent module may check validity of the application in a cryptographic manner (for example, a signature) or a static table configuration manner. If the second application is an invalid application, the second agent module may not provide the identifier for the second application. Therefore, the second application cannot subsequently use the inter-application communication method in this embodiment of this application. Alternatively, the second agent module may provide the identifier for the second application, but records that the second application does not have the notification permission. On the contrary, if the second application is a valid application, the second agent module may provide the identifier for the second application, so that the second application can use the inter-application communication method in this embodiment of this application. The second agent module may record that the second application has the notification permission. The second agent module may transfer, to the first agent module on the first virtual apparatus side through an interface (for example, the first process module described below) between the second virtual apparatus and the first virtual apparatus, information that the second application has the notification permission.

After determining, for the first time, whether the second application has the notification permission, the first agent module may directly use a determining result of the first determining when subsequently needing to determine whether the second application has the notification permission again, and may not repeatedly perform determining.

In some cases, in addition to notifying each other, the first application and the second application further need to transfer a large number of data messages. If the first command queue and the second command queue are still used to transfer the data, a type, an amount, and the like of data that can be transferred are limited. Based on this, this embodiment of this application further provides that a shared memory is dynamically created between the first application and the second application based on an inter-application notification mechanism, so that the shared memory may be used as a dedicated data channel between the first application and the second application, and may be used to transfer a large number of types of data and a large amount of data. The following describes an example method for establishing the dedicated data channel in an embodiment of this application.

Figure 7:
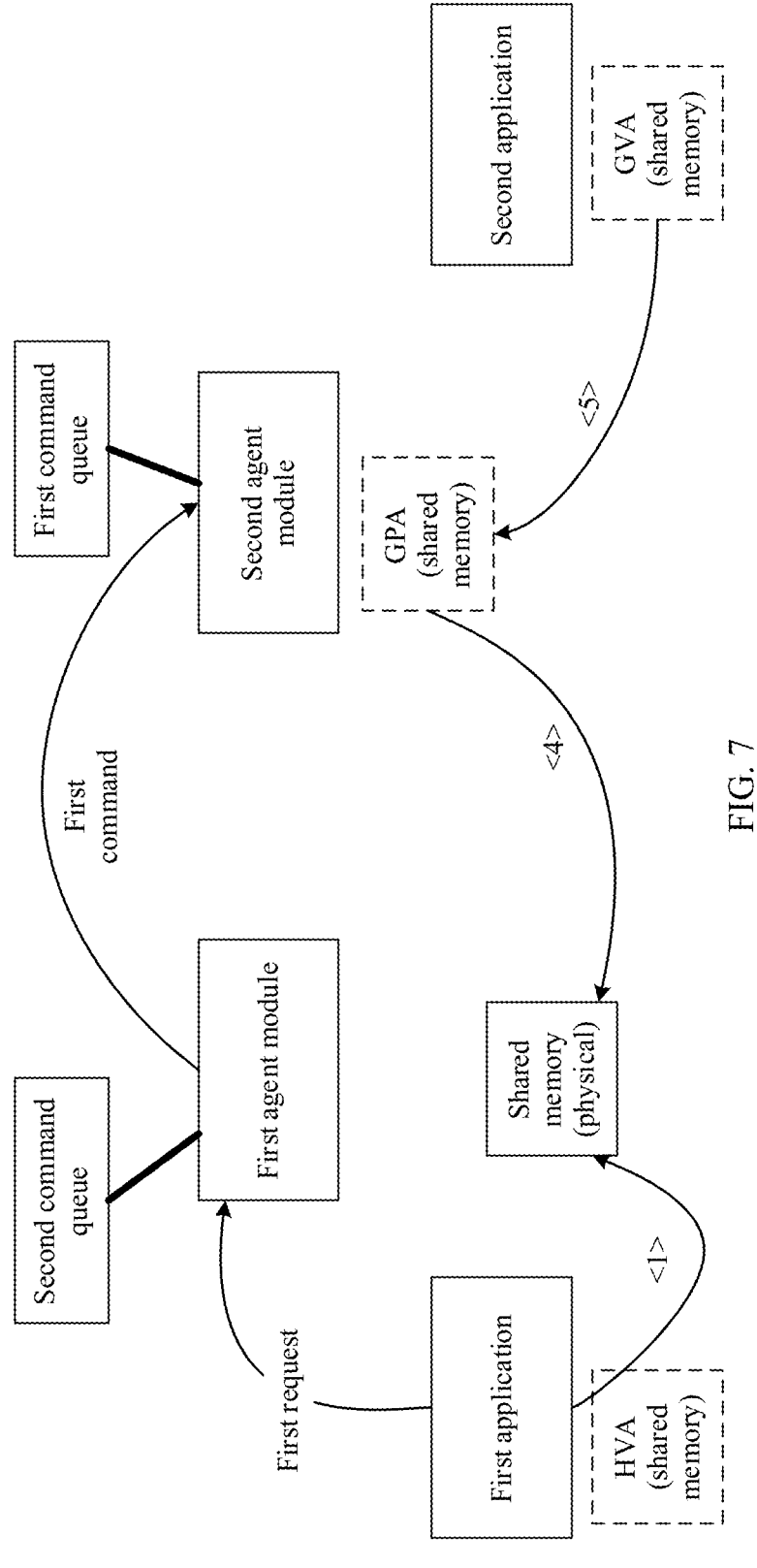
FIG. 7 is an example diagram of establishing a dedicated data channel according to an embodiment of this application.

FIG. 7 is an example diagram of establishing a dedicated data channel according to an embodiment of this application.

As shown in FIG. 7, in an implementation, before the first virtual apparatus writes the first command into the first command queue based on the first request sent by the first application, the method further includes:

the first virtual apparatus creates a shared memory in response to an application of the first application, and the first agent module establishes an association relationship between an address of the first application and an address of the shared memory, where the first request and the first command further include a parameter of the shared memory; and that the first agent module releases the blocked state of the first application when the second command includes an identifier of the first application includes:

when the second command includes the identifier of the first application and information indicating that a channel is successfully established, the first agent module releases the blocked state of the first application.

In this manner, the shared memory may be used as a dedicated data channel between the first application and the second application. Compared with a solution in which data is transferred only in a form of the command queue, in this manner, richer data can be transferred. In addition, the shared memory can transfer a large amount of data. This reduces a number of data copy times and improves data transmission efficiency.

For example, the first application may apply to the core at which the first virtual apparatus is located for creating a shared memory. After the application obtains a reference of the core of the first virtual apparatus, the core of the first virtual apparatus may allocate a physical memory page as the shared memory (that is, the shared memory created by the first virtual apparatus), and a real address of the physical memory page is associated with a virtual address of the shared memory. The first agent module may establish an association relationship (<1>) between the address of the first application and the address of the shared memory. Therefore, the first application can use the shared memory. Because the shared memory is associated with the physical memory page, when the first application accesses data through the shared memory, access to a plurality of types of data with a large amount of data can be met. In FIG. 7, HVA represents a virtual shared memory address corresponding to the physical memory page.

When the first application has a usable shared memory, the first request and the first command may further include a parameter of the shared memory, for example, a name and a size of the shared memory. In this case, the first request may be a request from the first application for communication with the second application on the second virtual apparatus and creation of the dedicated data channel between the first application and the second application.

On the second virtual apparatus, when driving the first application to be run based on the first command, the second agent module may further establish dedicated data transmission channels (<4><5>) for the second application and the first application. For an example manner of the second agent module, refer to related descriptions of FIG. 7 in the following. The second request may be sent by the second application after the dedicated data channel is successfully established. The second request may include information indicating that the channel is successfully established. Therefore, the second command may also include the information indicating that the channel is successfully established, that is, the second command may include the identifier of the first application and the information indicating that the channel is successfully established.

That when the second command includes the identifier of the first application, the first agent module releases the blocked state of the first application may be that when the second command includes the identifier of the first application and the information indicating that the channel is successfully established, the first agent module releases the blocked state of the first application. In this case, the first application and the second application may transfer data information to each other through the dedicated data channel. Optionally, when the channel is successfully established, the information indicating that the channel is successfully established may also be transmitted through an established dedicated data channel. A transfer manner of the information indicating that the channel is successfully established is not limited in this disclosure.

As shown in FIG. 7, in an implementation, that the second agent module runs the second application based on the identifier of the second application in the first command includes:

the second agent module determines, based on the first command, whether the second application has permission to access the shared memory; and the second agent module runs the second application, and establishes an association relationship between an address of the second application and the address of the shared memory when the second application has the permission to access the shared memory, where the second command further includes information indicating that the channel is successfully established or that the channel fails to be established.

In this manner, before the dedicated data channel is established, the second agent module may determine whether the second application has the permission to access the shared memory. The dedicated data channel is established when the second application has the permission to access the shared memory, to ensure security of establishing the dedicated data channel. The information indicating that the channel is successfully established or that the channel fails to be established is transferred to the first virtual apparatus side based on the second command, so that the first application of the first virtual apparatus may determine an execution status of the request of the first application.

For example, when the first command includes the identifier of the second application and the parameter of the shared memory, the second agent module may determine, based on the first command, that the first application initiates the request for communication with the second application on the second virtual apparatus and creation of the dedicated data channel between the first application and the second application. In some scenarios, for example, a microkernel scenario, there may be a requirement for permission of applications, and authentication needs to be performed on the applications, to ensure data transmission security. In this case, the second agent module may first run the second application, and at the same time determine whether the second application has the permission to access the shared memory. When the second application has the permission to access the shared memory, it may be considered that the second application may be used as a user of the dedicated data channel. In this case, the second application may allocate a virtual shared memory address (GPA), and use a hypercall instruction to request a virtual machine monitor or a physical machine kernel to establish a stage 2 page table, that is, establish an association relationship between the virtual shared memory address GPA and the shared memory (physical) address (<4>). Then, the second agent module maps the address (GVA) of the second application to the virtual shared memory address GPA (<5>), to complete establishment of the association relationship between the address of the second application and the address of the shared memory. Synchronization of locations and sizes of the shared memory may be implemented based on the first command queue and the second command queue. It can be learned from the foregoing description that there is also the association relationship between the address of the shared memory and the address of the first application. Therefore, it is equivalent to that the address of the first application is associated with the address of the second application. In other words, the dedicated data channel between the first application and the second application is successfully established, and the first application and the second application may complete data transmission with each other through the shared memory. The second command may further include the information indicating that the channel is successfully established, to notify the first application that the dedicated data channel requested by the first application has been successfully established.

If the second application does not have the permission to access the shared memory, it may be considered that the second application cannot be used as the user of the dedicated data channel, and the association relationship between the address of the second application and the address of the shared memory may not be established. The second command may further include information indicating that channel fails to be established, to notify the first application that the dedicated data channel requested by the first application fails to be established.

Optionally, if there is an interface on the physical machine side, a capability of the shared memory may also be dynamically scaled-out/scaled-in based on the procedure in FIG. 7. For example, when data does not need to be transmitted or an amount of data that needs to be transmitted is far less than a size of the created shared memory, the established dedicated data channel may be further dynamically deleted or a size of the dedicated data channel may be dynamically adjusted, so as to ensure flexibility of resource deployment and improve memory usage.

The inter-application communication method in this embodiment of this application depends on inter-core interrupt receiving/sending between the virtual machine and the physical machine to implement mutual notification. Therefore, if two applications are notified for a plurality of times, a large number of commands may be generated. In this case, inter-core interrupts may be aggregated through the following control channel, so as to reduce a number of receiving/ sending times of the inter-core interrupt.

In an implementation, the shared memory is further used as a control channel, the control channel includes a first data bit and a second data bit, and states of the first data bit and the second data bit are controlled by the first agent module and the second agent module.

Before step S2, the method further includes:

the first agent module controls the first data bit to be in a set state and the second data bit to be in a non-set state; and that the first agent module outputs the first inter-core interrupt to the core in which the second virtual apparatus is located includes:

when the first agent module determines that the first data bit of the control channel between the first application and the second application is in the set state and the second data bit is in the non-set state, the first agent module outputs the first inter-core interrupt to the core in which the second virtual apparatus is located.

The control channel is dedicated to controlling sending and receiving of the inter-core interrupt, so that a number of receiving/sending times of the inter-core interrupt can be reduced, and implementation complexity of the inter-application communication method can be reduced.

Figure 8:
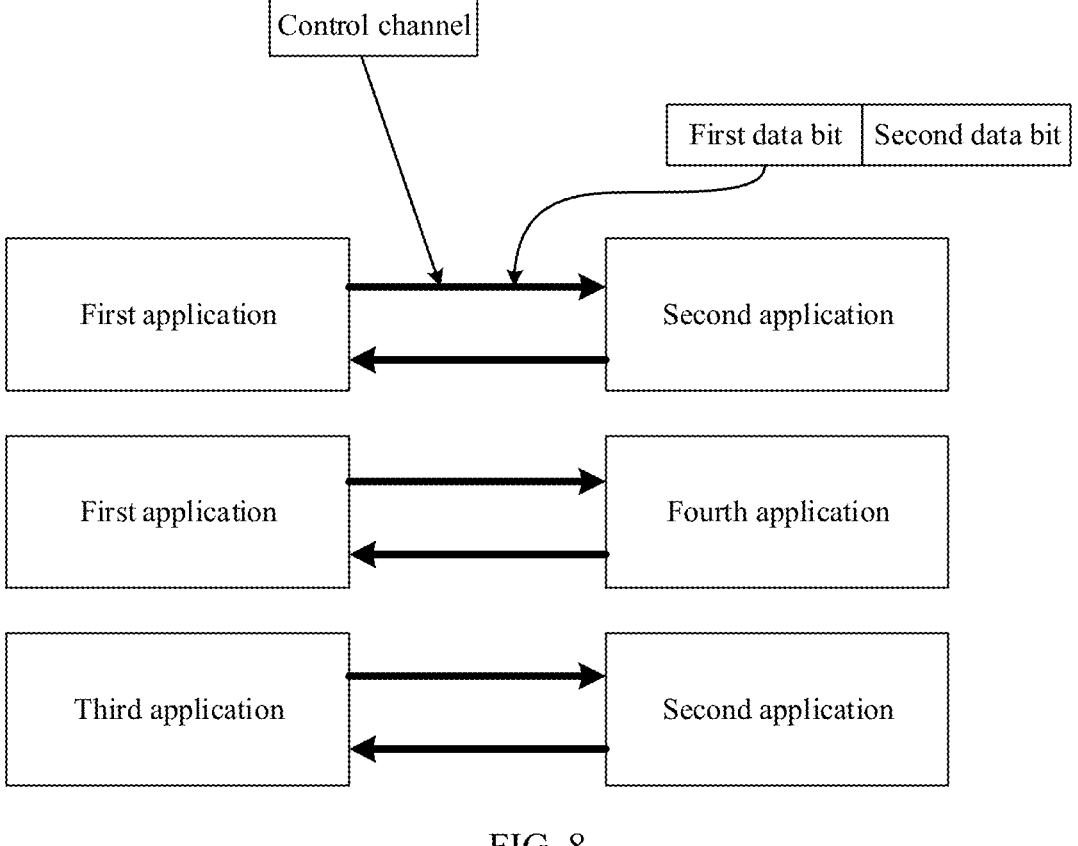
FIG. 8 shows an example of a control channel according to an embodiment of this application.

For example, optionally, a dedicated data channel between the first application and the second application may be set as the control channel. In this case, the control channel also becomes a private control channel between the first application and the second application. FIG. 8 shows an example of a control channel according to an embodiment of this application.

As shown in FIG. 8, a first application and a third application may be applications on the first virtual apparatus side, and a second application and a fourth application may be applications on the second virtual apparatus side. In the example in FIG. 8, an electronic device may include a control channel between the first application and the second application, a control channel between the first application and the fourth application, and a control channel between the third application and the second application.

The control channel between the first application and the second application is used as an example. The control channel may at least include a first data bit and a second data bit, and states of the first data bit and the second data bit may be controlled by the first agent module and the second agent module. The states of the first data bit and the second data bit may include a set state and a non-set state. The set state of the first data bit of the channel may indicate that the first application has a request to be sent to the second application. In this case, the set state of the second data bit of the channel may indicate that the second application is processing the request, the non-set state of the second data bit of the channel may indicate that the second application has not processed the request, and the non-set state of the first data bit of the channel may indicate that the first application has no request to be sent to the second application.

Because the control channel is essentially the shared memory between the first application and the second application, the states of the first data bit and the second data bit may be synchronized between the first agent module and the second agent module. For example, after the first agent module controls the first data bit to be in the set state, if the second agent module obtains a state of the first data bit, the obtained state may be the set state. In this case, after the second agent module controls the first data bit to be in the non-set state, if the first agent module obtains the state of the first data bit, the obtained state may be the non-set state.

Therefore, when the first virtual apparatus needs to send the first inter-core interrupt to the second virtual apparatus, before step S2 is performed, if the first agent module may first control the first data bit of the control channel between the first application and the second application to be in the set state and the second data bit to be in the non-set state, it indicates that the first application has a request to be sent to the second application, and the second application has not processed the request. In this case, the first agent module then outputs the first inter-core interrupt to the second virtual apparatus.

In an implementation, that the second agent module obtains the first command from the first command queue based on the first inter-core interrupt includes:

the second agent module traverses, based on the first inter-core interrupt, control channels associated with all applications corresponding to the second agent module on the second virtual apparatus; and when determining that the first data bit of the control channel between the first application and the second application is in the set state, the second agent module obtains the first command from the first command queue.

The second agent module checks first data bits of the control channels associated with all the applications corresponding to the second agent module, to determine that an application corresponding to which channel sends a request. The second agent module determines, based on the state of the first data bit, whether a command needs to be obtained, so that repeated obtaining of the command can be avoided, and working efficiency of the second agent module can be improved.

For example, on the second virtual apparatus, the second agent module may act as an agent for at least one application, and one control channel may be associated between each application and an application on another virtual machine or physical machine, that is, the second agent module may correspond to a plurality of control channels. When an inter-core interrupt arrives, the second agent module may only determine that a request needs to be processed by an application for which the second agent module acts an agent, and may not know that the inter-core interrupt is sent based on a request of which application and that the inter-core interrupt needs to be processed by which application.

In this case, that the second agent module obtains the first command from the first command queue based on the first inter-core interrupt may be that the second agent module first traverses, based on the first inter-core interrupt, the control channels that are on the second virtual apparatus and that are associated with all the applications corresponding to the second agent module, and determines states of first data bits of the control channels. When it is determined that the first data bit of the control channel between the first application and the second application is in the set state, it may be considered that the first application has a request to be sent to the second application, and then the first command is obtained from the first command queue. If it is determined that the first data bit of the control channel between the first application and the second application is in the non-set state, it may be considered that the first application has no request to be processed by the second application, and the first command does not need to be obtained from the first command queue.

In an implementation, after step S4, the method further includes:

the second agent module controls the first data bit of the control channel between the first application and the second application to be in the non-set state and the second data bit to be in the set state;

for the control channel between the first application and the second application, after the second application finishes running, when determining that the first data bit of the control channel is in the non-set state, the second agent module controls the second data bit of the control channel to be in the non-set state; and when determining that the first data bit of the control channel is in the set state, the second agent module re-obtains a command from the first command queue, and schedules, based on an identifier of the second application in the newly obtained command, the second application to be run.

In this manner, after the request of the control channel between the first application and the second application is processed completely, a new request subsequently initiated by the first application may continue to be processed, and the new request does not need to be processed after the inter-core interrupt is obtained first, thereby reducing the number of receiving/sending times of the inter-core interrupt, and reducing data transmission costs.

For example, after obtaining the first command from the first command queue, the second agent module may perform step S4 to run the second application, and process the request sent by the first application to the second application. In this case, it may be considered that the second application has processed the request. The second agent module may control the first data bit of the control channel between the first application and the second application to be in the non-set state and the second data bit to be in the set state. In a process of running the second application, the first application may further continue to initiate a request, and this action may cause the first data bit of the control channel to be in the set state under control of the first agent module. Therefore, after the second application finishes running, the second agent module may check the first data bit of the control channel between the first application and the second application. If it is determined that the first data bit of the control channel is still in the non-set state, it may be considered that the first application does not further initiate the request to the second application, and the set state of the second data bit may be cleared, that is, the second data bit of the control channel is controlled to be in the non-set state. If it is determined that the first data bit of the control channel is in the set state, it may be considered that the first application further initiates another request to the second application, may re-obtain a command from the first command queue, and schedule, based on an identifier of the application in the newly obtained command, a corresponding application to be run.

After scheduling an application based on a request of a control channel is completed, it is determined that a first data bit of the control channel is in a non-set state, and the second agent module may continue to view states of a first data bit and a second data bit of another control channel and perform request processing. For an implementation of the control channel, refer to the foregoing description related to the control channel between the first application and the second application. Details are not described herein again.

Figure 9:
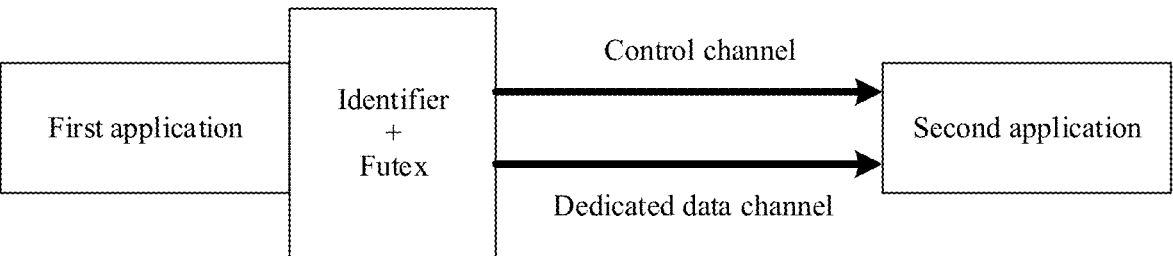
FIG. 9 shows an example of binding a control channel, a dedicated data channel, an identifier, and a futex between a first application and a second application according to an embodiment of this application.

Refer to the foregoing description. Both the control channel and the dedicated data channel are channels between the first application and the second application, and functions of the control channel and the dedicated data channel are different. Therefore, the control channel and the dedicated data channel between the first application and the second application may be bound together, where the control channel is used to aggregate inter-core interrupts, and the dedicated data channel is used to carry communication data. The dedicated data channel may also be bound to an identifier and a futex of a data sender (for example, the first application described above), to block and unblock the data sender. FIG. 9 shows an example of binding a control channel, a dedicated data channel, an identifier, and a futex between a first application and a second application according to an embodiment of this application. In conclusion, with reference to the identifier/futex, the control channel, the dedicated data channel, the first command queue, and the second command queue, the inter-application communication method in this embodiment of this application may become a high-performance fast notification and data transmission solution in which the interrupts can be aggregated.

Figure 10A:
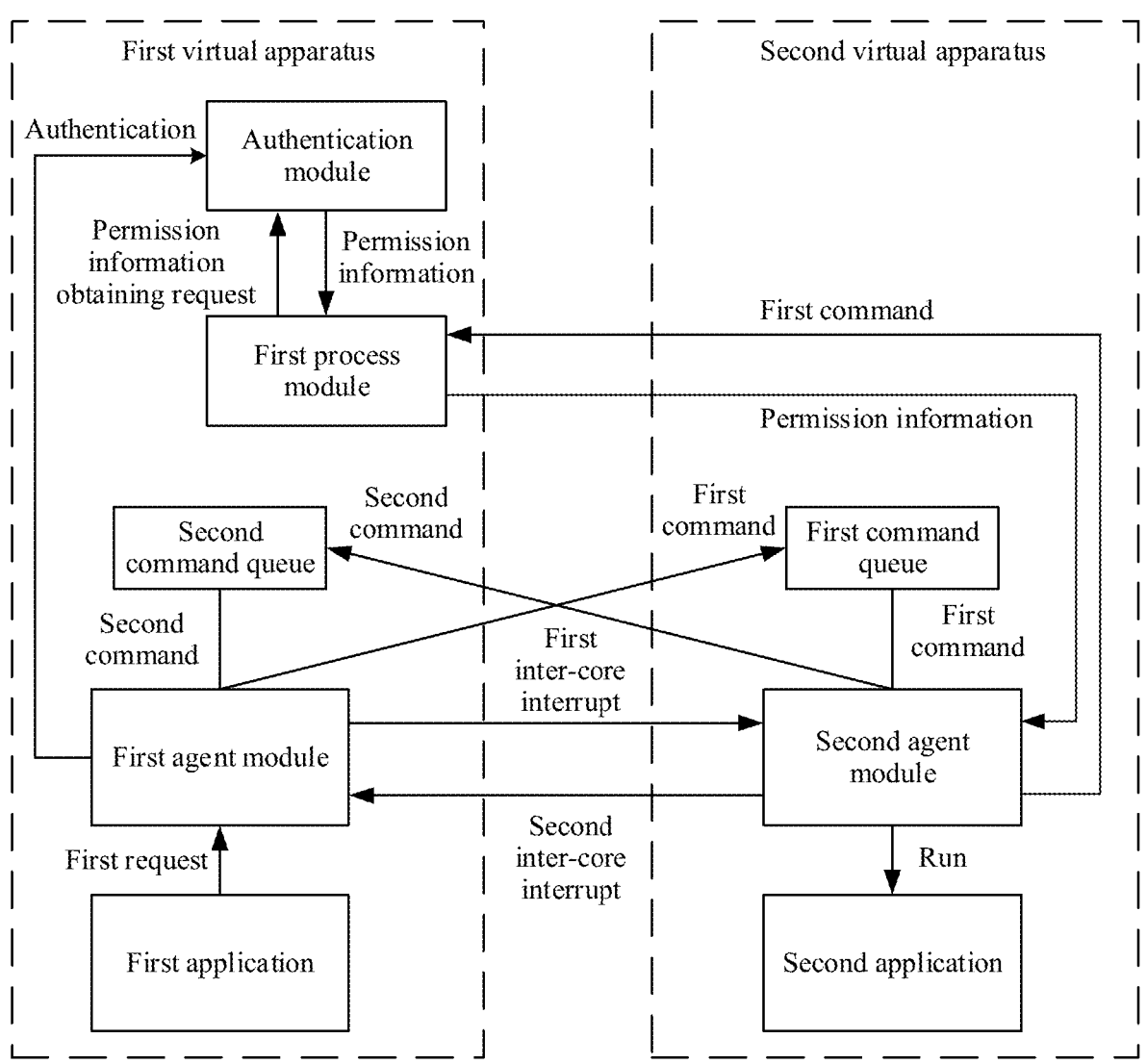
FIG. 10a is a diagram of an example method for determining whether a second application has permission to access a shared memory according to an embodiment of this application.
Figure 10B:
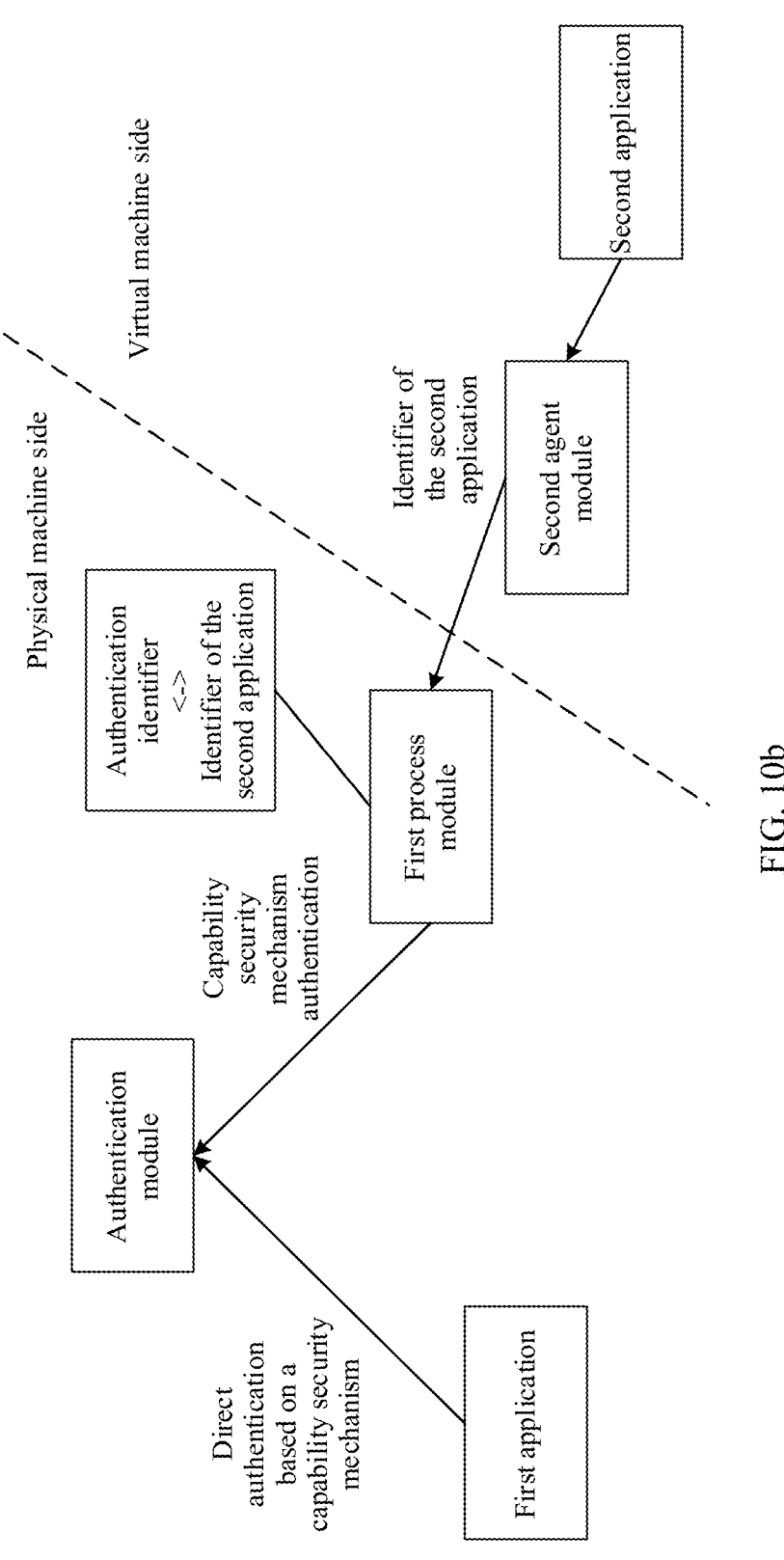
FIG. 10b is a diagram of an example method for determining whether a second application has permission to access a shared memory according to an embodiment of this application.

As mentioned above, in some scenarios, for example, a microkernel scenario, there may be a requirement for communication security. Therefore, the notification permission of the second application and the permission to access the shared memory may be further determined. Related descriptions of determining whether the second application has the notification permission have been described. The following describes an example method for determining whether the second application has the permission to access the shared memory. FIG. 10a and FIG. 10b each are a diagram of an example method for determining whether a second application has permission to access a shared memory according to an embodiment of this application.

As shown in FIG. 10a, in an implementation, when the first virtual apparatus is the physical machine and the second virtual apparatus is the virtual machine, the first virtual apparatus further includes an authentication module and a first process module, and that the second agent module determines, based on the first command, whether the second application has permission to access the shared memory includes:

the second agent module forwards the identifier that is of the second application and that is in the first command to the first process module on the first virtual apparatus;

the first process module determines an authentication identifier corresponding to the identifier of the second application, and sends a permission information obtaining request to the authentication module, where the permission information obtaining request includes the authentication identifier;

the first process module receives permission information of the second application from the authentication module, and transmits the permission information to the second agent module; and the second agent module determines, based on the permission information of the second application, whether the second application has the permission to access the shared memory.

When the first virtual apparatus is the physical machine, the first process module may be used as an interface between the virtual machine side and the physical machine side, so that related information of the application on the virtual machine side may be transmitted to the physical machine side via the first process module, and the authentication module on the physical machine side may be used to perform authentication on the application on the virtual machine side. The authentication module performs authentication, so that data transmission security can be further improved.

For example, in the conventional technology, a microkernel of the physical machine has extremely high security, and reliability of the microkernel may be proved through formal verification, for example, mathematics. The microkernel has an authentication module for a kernel object, and the authentication module may support, for example, a capability security mechanism (capability mechanism) in the conventional technology. In the capability security mechanism, the authentication identifier may be used as a special object, and each application needs to have an authentication identifier of the peer end to access a specific kernel object or execute a specific procedure. Therefore, the application on the virtual machine in this embodiment of this application may also be authenticated by the authentication module.

As shown in FIG. 10b, it is assumed that the first virtual apparatus is the physical machine (host machine), the authentication module may be a module disposed on the physical machine side. Because each application on the physical machine side and the authentication module are disposed on a same physical machine, for the authentication module, each application on the physical machine side is located within a trusted boundary, and each application on the physical machine side may be directly authenticated based on the capability security mechanism of the authentication module. Assuming that the second virtual apparatus is the virtual machine, when an application disposed on the virtual machine needs to be authenticated by the authentication module, the first process module on the physical machine needs to be used.

The first process module may be responsible for processing a process that corresponds to the virtual machine and that is on the physical machine side. The process corresponding to the virtual machine may be essentially a common user-mode thread. Therefore, the first process module itself also needs to perform permission management via the authentication module. Only after the first process module first obtains permission to access some resources (for example, the shared memory), the first process module can grant authorization to many applications in the virtual machine.

For the applications inside the virtual machine, because the authentication module is on the physical machine side, the physical machine side cannot sense a difference between the applications inside the virtual machine. Therefore, the first process module may assist the physical machine in performing function maintenance for the applications inside the virtual machine. Each application inside the virtual machine may be selected as an "instance" of a virtual machine kernel, that is, an entity that can obtain a capability security mechanism. The second application is used as an example. When the second application needs to be authenticated, the second agent module needs to be used. The second agent module transfers the identifier of the second application to the first process module, and the first process module determines an authentication identifier corresponding to the identifier of the second application (obtains a mapping between the authentication identifier and the identifier of the second application), and sends, to the authentication module, a permission information obtaining request whose permission information includes the authentication identifier.

In this case, the authentication module may identify the authentication identifier, and determine permission information of an application corresponding to the authentication identifier. The application corresponding to the authentication identifier is the second application. The authentication module may send the determined permission information of the second application to the first process module. After obtaining the permission information of the second application, the first process module transmits the permission information to the second agent module, and the second agent module determines, based on the permission information of the second application, whether the second application has the permission to access the shared memory. After determining, for the first time, whether the second application has the permission to access the shared memory, the second agent module may directly use a determining result of the first determining when subsequently needing to determine whether the second application has the permission to access the shared memory again, and may not repeatedly perform determining.

Optionally, the notification permission of the second application may also be authenticated by the authentication module. For example, when providing the identifier for the second application, the second agent module may notify the authentication module of identity information of the second application and the identifier of the second application via the first process module, so that the authentication module learns that the second application is a valid entity, to determine that the second application has the notification permission. An example implementation in which the authentication module authenticates the notification permission of the second application may be the same as a manner in which the authentication module authenticates the permission of the second application for accessing the shared memory. Details are not described herein again.

Optionally, the inter-application communication method in this embodiment of this application may also be used for fast communication between two virtual machines. Two virtual machines to which two applications that need to communicate with each other belong are authenticated via a kernel of the physical machine, to enable the shared memory to be visible to both the two virtual machines. In this case, the physical machine may perform work such as initialization and application of dedicated data channels for the two virtual machines.

Figure 11A:
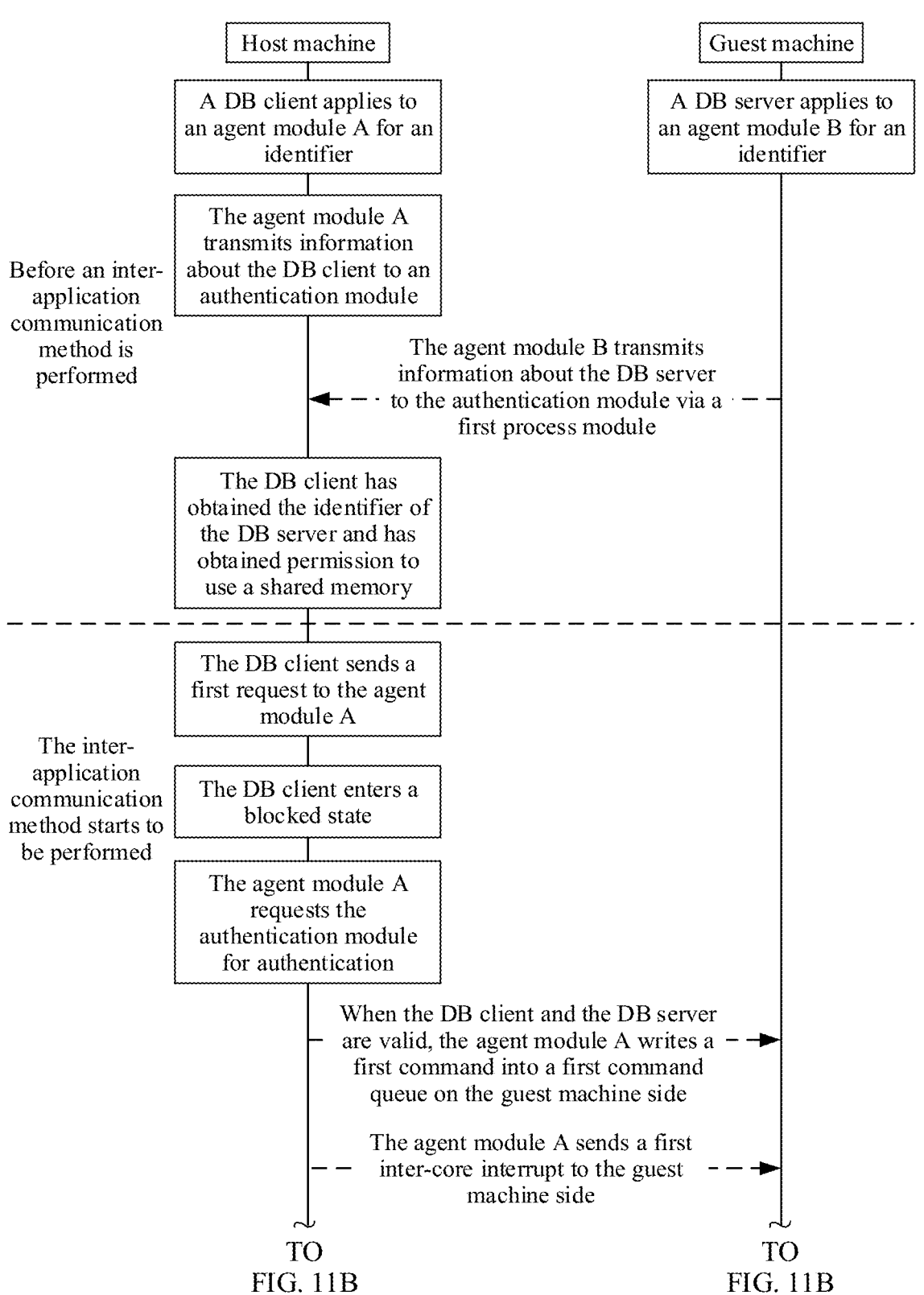
FIG. 11A and FIG. 11B show an example of an inter-application communication method according to an embodiment of this application.
Figure 11B:
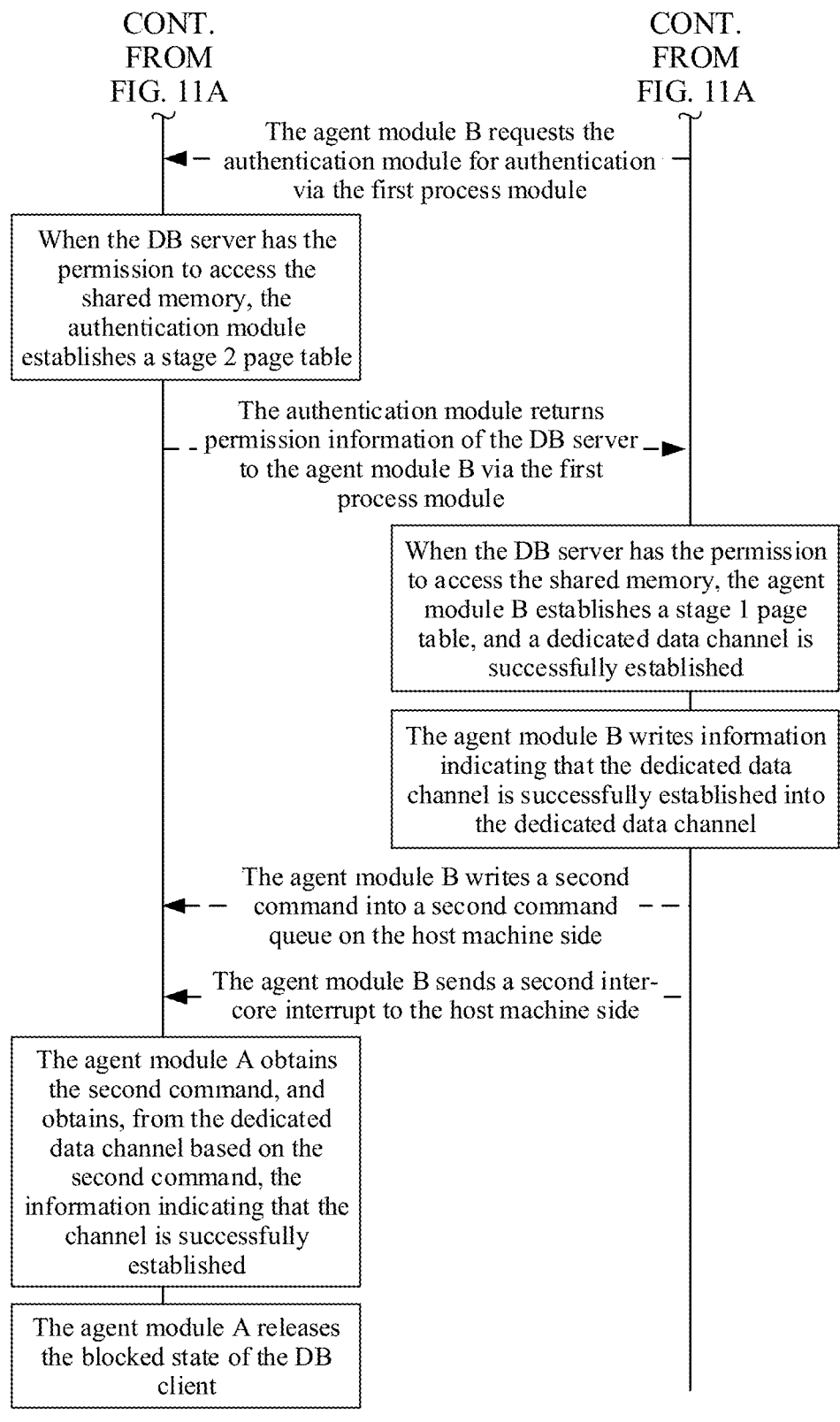

FIG. 11A and FIG. 11B shows an example of an inter-application communication method according to an embodiment of this application. In this example, fast communication is implemented between a DB client on the host machine side and a DB server on the guest machine. In the example in FIG. 11A and FIG. 11B, the host machine corresponds to the first virtual apparatus, and the guest machine corresponds to the second virtual apparatus. On the host machine side, an agent module A corresponds to the first agent module, and the DB client corresponds to the first application. On the guest machine side, an agent module B corresponds to the second agent module, and the DB server corresponds to the second application.

As shown in FIG. 11A and FIG. 11B, first, before the inter-application communication method is performed, on the host machine side, the DB client has applied to the agent module A for an identifier of the DB client, and the agent module A has also transmitted information about the DB client to an authentication module on the host machine side. On the guest machine side, the DB server has applied to the agent module B for an identifier of the DB server, and the agent module B has also transmitted information about the DB server to the authentication module via a first process module on the host machine side. The DB client has obtained the identifier of the DB server. The DB client has obtained permission to use a shared memory.

When the inter-application communication method is performed, on the host machine side, the DB client sends a first request to the agent module A, where the first request may be a request for establishment of a dedicated data channel between the DB client and the DB server. The first request may include the identifier of the DB client, the identifier of the DB server, blocking information of the DB client, and a parameter of the shared memory. After the first request is sent, the DB client enters a blocked state.

Based on the first request, the agent module A requests the authentication module to determine whether the identifiers of the DB client and the DB server are valid. For example, whether the DB client and the DB server have the notification permission is checked. When the identifiers of the DB client and the DB server are valid, for example, when the DB client and the DB server have the notification permission, the agent module A writes a first command into a first command queue on the guest machine side, and sends a first inter-core interrupt to the guest machine side. The first command may be a command for establishing the dedicated data channel between the DB client and the DB server, and may include the identifier of the DB client, the identifier of the DB server, the blocking information of the DB client, and the parameter of the shared memory.

On the guest machine side, the agent module B receives the first inter-core interrupt, and obtains the first command from the first command queue. Based on the first command, the agent module B determines that the command is to establish the dedicated data channel between the DB client and the DB server, and the agent module B first requests, via the first process module based on the DB server in the first command, the authentication module on the host machine side for authentication. After determining that the DB server has the permission to access the shared memory, the authentication module authorizes the permission to use the shared memory to the DB server based on a capability security mechanism, establishes a stage 2 page table, and then returns the permission information of the DB server to the agent module B via the first process module. When the DB server has the permission to access the shared memory, the agent module B also maps a virtual address of the DB server to the shared memory (establishing a stage 1 page table), to complete establishment of the dedicated data channel.

The agent module B writes information indicating that the channel is successfully established into the dedicated data channel, and notifies the host machine side in a manner of writing a second command into a second command queue on the host machine side and sending a second inter-core interrupt, so that the agent module A on the host machine side may obtain, from the dedicated data channel, the information indicating that the channel is successfully established. The agent module A may release the blocked state of the DB client.

After the dedicated data channel is established, a control channel or more data channels may be further established between the DB client and the DB server. In addition, the dedicated data channel has been authenticated. Therefore, the dedicated data channel does not need to be authenticated again in subsequent use.

In this manner, when the DB client communicates with the DB server, virtual machine entry/exit may not occur. In addition to a channel initialization process, information sending and receiving activities of a kernel of the guest machine may be limited only inside the kernel of the guest machine. In addition, in a channel establishment process, security of the dedicated data channel is ensured through authentication. A private dedicated data channel is securely enabled between the DB client and the DB server through agent module and application hierarchical management and the capability security mechanism of the microkernel. Except the DB client and the DB server, other entities cannot obtain the permission to use the channel through normal means.

Figure 12:
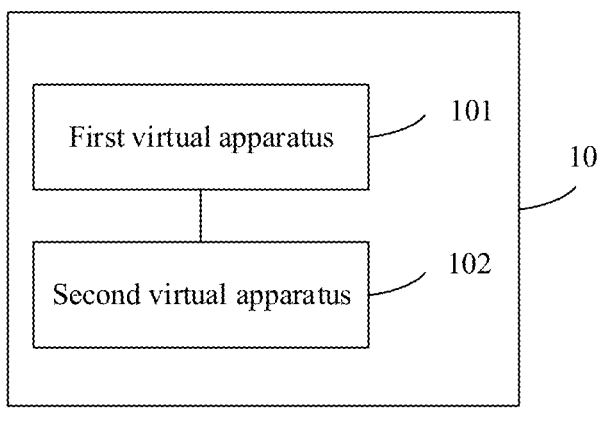
FIG. 12 is a diagram of an example structure of an inter-application communication apparatus 10 according to an embodiment of this application.

FIG. 12 is a diagram of an example structure of an inter-application communication apparatus 10 according to an embodiment of this application.

As shown in FIG. 12, in an implementation, an embodiment of this application provides an inter-application communication apparatus 10. The apparatus 10 is used in an electronic device. The electronic device includes a first virtual apparatus 101 and a second virtual apparatus 102, one of the first virtual apparatus 101 and the second virtual apparatus 102 is a virtual machine, and the other is a physical machine. The apparatus 10 includes:

the first virtual apparatus 101, configured to: write a first command into a first command queue based on a first request sent by a first application, where the first request and the first command include an identifier of a second application on the second virtual apparatus; and output a first inter-core interrupt to a core in which the second virtual apparatus 102 is located, so that the second virtual apparatus 102 is capable of obtaining the first inter-core interrupt; and the second virtual apparatus 102, configured to: obtain the first command from the first command queue based on the first inter-core interrupt, and run the second application based on the identifier that is of the second application and that is in the first command.

In an implementation, the first virtual apparatus 101 further includes a first agent module. The first agent module is configured to: receive the first request sent by the first application, write the first command into the first command queue based on the first request, and output the first inter-core interrupt to the core in which the second virtual apparatus 102 is located.

In an implementation, the second virtual apparatus 102 further includes a second agent module. The second agent module is configured to: obtain the first command from the first command queue based on the first inter-core interrupt, and run the second application based on the identifier that is of the second application and that is in the first command.

In an implementation, the first request and the first command further include blocking information of the first application. After the first agent module receives the first request sent by the first application, the first application enters a blocked state. When receiving a second inter-core interrupt, the first agent module is further configured to obtain a second command from a second command queue based on the second inter-core interrupt, where the second inter-core interrupt is generated after the second application finishes running. The first agent module is further configured to release the blocked state of the first application when the second command includes an identifier of the first application.

In an implementation, after the second application finishes running, the second agent module is further configured to: receive a second request sent by the second application, where the second request includes the identifier of the first application; write the second command into the second command queue based on the second request, where the second command includes the identifier of the first application; and output the second inter-core interrupt to a core in which the first virtual apparatus 101 is located, so that the first virtual apparatus 101 is capable of obtaining the second inter-core interrupt.

In an implementation, that the first agent module writes the first command into the first command queue based on the first request includes: the first agent module determines, based on the first request, whether the second application has notification permission, and writes the first command into the first command queue when the second application has the notification permission.

In an implementation, the first virtual apparatus 101 is further configured to create a shared memory in response to an application of the first application, and the first agent module is further configured to establish an association relationship between an address of the first application and an address of the shared memory, where the first request and the first command further include a parameter of the shared memory. That the first agent module releases the blocked state of the first application when the second command includes an identifier of the first application includes: when the second command includes the identifier of the first application and information indicating that a channel is successfully established, the first agent module releases the blocked state of the first application.

In an implementation, that the second agent module runs the second application based on the identifier that is of the second application and that is in the first command includes: the second agent module determines, based on the first command, whether the second application has permission to access the shared memory. The second agent module runs the second application, and establishes an association relationship between an address of the second application and the address of the shared memory when the second application has the permission to access the shared memory, where the second command further includes information indicating that the channel is successfully established or that the channel fails to be established.

In an implementation, the shared memory is further used as a control channel, the control channel includes a first data bit and a second data bit, and states of the first data bit and the second data bit are controlled by the first agent module and the second agent module. The first agent module is further configured to control the first data bit to be in a set state and the second data bit to be in a non-set state. That the first agent module outputs the first inter-core interrupt to the core in which the second virtual apparatus 102 is located includes: when the first agent module determines that the first data bit of the control channel between the first application and the second application is in the set state and the second data bit is in the non-set state, the first agent module outputs the first inter-core interrupt to the core in which the second virtual apparatus 102 is located.

In an implementation, that the second agent module obtains the first command from the first command queue based on the first inter-core interrupt includes: the second agent module traverses, based on the first inter-core interrupt, control channels associated with all applications corresponding to the second agent module on the second virtual apparatus. When determining that the first data bit of the control channel between the first application and the second application is in the set state, the second agent module obtains the first command from the first command queue.

In an implementation, the second agent module is further configured to control the first data bit of the control channel between the first application and the second application to be in the non-set state and the second data bit to be in the non-set state. For the control channel between the first application and the second application, after the second application finishes running, the second agent module is further configured to: when determining that the first data bit of the control channel is in the non-set state, control the second data bit of the control channel to be in the set state. The second agent module is further configured to: when determining that the first data bit of the control channel is in the set state, re-obtain a command from the first command queue, and schedule, based on an identifier of the second application in the newly obtained command, the second application to be run.

In an implementation, when the first virtual apparatus 101 is the physical machine and the second virtual apparatus 102 is the virtual machine, the first virtual apparatus 101 further includes an authentication module and a first process module. That the second agent module determines, based on the first command, whether the second application has permission to access the shared memory includes: the second agent module forwards the identifier that is of the second application and that is in the first command to the first process module on the first virtual apparatus. The first process module determines an authentication identifier corresponding to the identifier of the second application, and sends a permission information obtaining request to the authentication module, where the permission information obtaining request includes the authentication identifier. The first process module receives permission information of the second application from the authentication module, and transmits the permission information to the second agent module. The second agent module determines, based on the permission information of the second application, whether the second application has the permission to access the shared memory.

Figure 13:
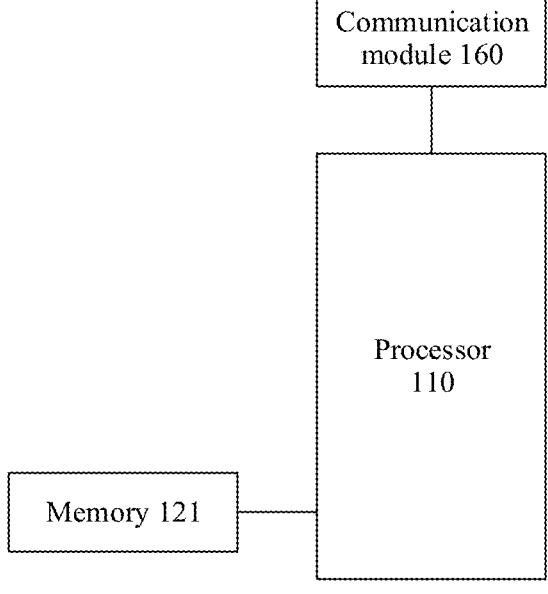
FIG. 13 is a diagram of an example structure of an inter-application communication apparatus according to an embodiment of this application.

FIG. 13 is a diagram of an example structure of an inter-application communication apparatus according to an embodiment of this application.

An embodiment of this application provides an inter-application communication apparatus. The apparatus includes a processor and a memory configured to store instructions executable by the processor. When the processor is configured to execute the instructions, the method is implemented.

The inter-application communication apparatus may be disposed in an electronic device, and may include at least one of a mobile phone, a foldable electronic device, a tablet computer, a desktop computer, a laptop computer, a handheld computer, a notebook computer, a screen sound box, an ultra-mobile personal computer (UMPC), a netbook, an augmented reality (AR) device, a virtual reality (VR) device, an artificial intelligence (AI) device, an unmanned aerial vehicle, a vehicle-mounted device, a smart home device, or a smart city device. A type of the inter-application communication apparatus is not limited in this embodiment of this application.

The inter-application communication apparatus may include a processor 110, an internal memory 121, a communication module 160, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. For example, the processor 110 may perform output of a first inter-core interrupt and the like in this embodiment of this application, to implement the inter-application communication method in this embodiment of this application.

A memory may be further disposed in the processor 110, and is configured to store instructions and data. In some embodiments, the memory in the processor 110 may be a cache. The memory may store instructions or data that is used by the processor 110 or that is frequently used by the processor 110, for example, a first command in this embodiment of this application. If the processor 110 needs to use the instructions or the data, the processor 110 may directly invoke the instructions or the data from the memory. This avoids repeated access, reduces waiting time of the processor 110, and improves system efficiency.

In some embodiments, the processor 110 may include one or more interfaces. The interfaces may include an inter-integrated circuit (I2C) interface, a universal asynchronous receiver/transmitter (UART) interface, a general-purpose input/output (GPIO) interface, or the like. The processor 110 may be connected to modules such as a wireless communication module, a display, and a camera through at least one of the foregoing interfaces.

The memory 121 may be configured to store computer-executable program code. The executable program code includes instructions. The memory 121 may include a program storage area and a data storage area. The program storage area may store an operating system, an application required by at least one function (for example, an application that writes the first command into a first command queue), and the like. The data storage area may store data (for example, the first command) created in a process of using the inter-application communication apparatus. In addition, the memory 121 may include a high-speed random access memory, and may further include a nonvolatile memory, for example, at least one magnetic disk storage device, a flash storage device, or a universal flash storage (UFS). The processor 110 runs the instructions stored in the memory 121, and/or the instructions stored in the memory disposed in the processor, to perform various function methods or data processing of the inter-application communication apparatus.

The communication module 160 may be configured to receive data from another apparatus or device in a wired communication or wireless communication manner, or send data to another apparatus or device. The communication module 160 can provide wireless communication solutions that are used in the inter-application communication apparatus, for example, WLAN (such as a Wi-Fi network), Bluetooth (BT), global navigation satellite system (GNSS), frequency modulation (FM), near field communication (NFC), and infrared (IR) technologies. When the inter-application communication apparatus is connected to the another apparatus or device, the communication module 160 may alternatively use a wired communication solution.

It may be understood that the structure shown in this embodiment of this application does not constitute a limitation on the inter-application communication apparatus. In some other embodiments of this application, the inter-application communication apparatus may include more or fewer components than those shown in the figure, some components may be combined, some components may be split, or different component arrangements may be used. The components shown in the figure may be implemented by hardware, software, or a combination of software and hardware.

An embodiment of this application provides a non-volatile computer-readable storage medium. The non-volatile computer-readable storage medium stores computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code is run in a processor of an electronic device, a processor in the electronic device performs the foregoing method.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More examples (non-exhaustive list) of the computer-readable storage medium include: a portable computer disk, a hard disk, a random-access memory (RAM), a read-only memory (ROM), an erasable programmable read-only memory (EPROM, or flash memory), a static random-access memory (SRAM), a portable compact disk read-only memory (CD-ROM), a digital video disk (DVD), a memory stick, a floppy disk, a mechanical coding device, for example, a punching card or a groove protrusion structure that stores instructions, and any suitable combination thereof.

Computer-readable program instructions or code described herein can be downloaded to respective computing/processing devices from a computer-readable storage medium, or downloaded to an external computer or external storage device via a network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform the operations in this application may be assembly instructions, instruction set architecture (ISA) instructions, machine instructions, machine-related instructions, microcode, firmware instructions, status setting data, or source code or object code written in any combination of one or more programming languages. The programming languages include an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer over any kind of network, including a local area network (LAN) or a wide area network (WAN), or may be connected to an external computer (for example, connected over Internet using an Internet service provider). In some embodiments, an electronic circuit, for example, a programmable logic circuit, a field-programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a dedicated computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and block diagrams in the accompanying drawings show implementations of system architectures, functions, and operations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may actually be executed substantially in parallel, and may sometimes be executed in a reverse order, depending on a function involved.

It should also be noted that each block in the block diagram and/or the flowchart, and a combination of blocks in the block diagram and/or the flowchart may be implemented by hardware (for example, a circuit or an application-specific integrated circuit (ASIC)) that performs a corresponding function or action, or may be implemented by a combination of hardware and software, for example, firmware.

Although the present disclosure is described with reference to embodiments, in a process of implementing the present disclosure, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

The foregoing has described embodiments of this application. The foregoing descriptions are examples, not exhaustive, and are not limited to the disclosed embodiments. Without departing from the scope of the described embodiments, many modifications and variations are apparent to a person of ordinary skill in the technical field. The selection of terms used herein is intended to best explain the principles of embodiments, practical applications, or improvements to technologies in the market, or to enable another person of ordinary skill in the art to understand embodiments disclosed herein.

What is claimed is:

1. An inter-application communication method for use in an electronic device, the electronic device comprising a first apparatus and a second apparatus, one of the first apparatus or the second apparatus is a virtual machine and the other is a physical machine, the method comprising:

writing, by the first apparatus, a first command into a first command queue based on a first request sent by a first application, the first request and the first command comprising an identifier of a second application on the second apparatus;

outputting, by the first apparatus, a first inter-core interrupt to a core in which the second apparatus is located so the second apparatus is capable of obtaining the first inter-core interrupt;

obtaining, by the second apparatus, the first command from the first command queue based on the first inter-core interrupt; and running, by the second apparatus, the second application based on the identifier that is of the second application and that is in the first command.

2. The method according to claim 1, wherein the first apparatus further comprises a first agent module, and the writing, by the first apparatus, the first command into the first command queue based on the first request sent by the first application comprises:

receiving, by the first agent module, the first request sent by the first application; and writing, by the first agent module, the first command into the first command queue based on the first request; and the outputting, by the first apparatus, the first inter-core interrupt to the core in which the second apparatus is located comprises:

outputting, by the first agent module, the first inter-core interrupt to the core in which the second apparatus is located.

3. The method according to claim 1, wherein the second apparatus further comprises a second agent module, and the obtaining, by the second apparatus, the first command from the first command queue based on the first inter-core interrupt comprises:

obtaining, by the second agent module, the first command from the first command queue based on the first inter-core interrupt; and the running, by the second apparatus, the second application based on the identifier that is of the second application and that is in the first command comprises:

running, by the second agent module, the second application based on the identifier that is of the second application and that is in the first command.

4. The method according to claim 2, wherein the first request and the first command further comprise blocking information of the first application; and after the receiving, by the first agent module, the first request sent by the first application, the method further comprises:

entering, by the first application, a blocked state;

when receiving a second inter-core interrupt, obtaining, by the first agent module, a second command from a second command queue based on the second inter-core interrupt, wherein the second inter-core interrupt is generated after the second application finishes running; and releasing, by the first agent module, the blocked state of the first application when the second command comprises an identifier of the first application.

5. The method according to claim 4, wherein after the running, by the second apparatus, the second application based on the identifier that is of the second application and that is in the first command, the method further comprises:

after the second application finishes running, receiving, by the second agent module, a second request sent by the second application, wherein the second request comprises the identifier of the first application;

writing, by the second agent module, the second command into the second command queue based on the second request, wherein the second command comprises the identifier of the first application; and outputting, by the second agent module, the second inter-core interrupt to a core in which the first apparatus is located, so that the first apparatus is capable of obtaining the second inter-core interrupt.

6. The method according to claim 2, wherein the writing, by the first agent module, the first command into the first command queue based on the first request comprises:

determining, by the first agent module based on the first request, whether the second application has notification permission; and writing, by the first agent module, the first command into the first command queue when the second application has the notification permission.

7. The method according to claim 4, wherein before the writing, by the first apparatus, a first command into a first command queue based on a first request sent by a first application, the method further comprises:

creating, by the first apparatus, a shared memory in response to a request of the first application, and establishing, by the first agent module, an association relationship between an address of the first application and an address of the shared memory, wherein the first request and the first command further comprise a parameter of the shared memory; and the releasing, by the first agent module, the blocked state of the first application when the second command comprises an identifier of the first application comprises:

when the second command comprises the identifier of the first application and information indicating that a channel is successfully established, releasing, by the first agent module, the blocked state of the first application.

8. The method according to claim 7, wherein the running, by the second agent module, the second application based on the identifier that is of the second application and that is in the first command comprises:

determining, by the second agent module based on the first command, whether the second application has permission to access the shared memory; and running, by the second agent module, the second application, and establishing an association relationship between an address of the second application and the address of the shared memory when the second application has the permission to access the shared memory, wherein the second command further comprises information indicating that the channel is successfully established or that the channel fails to be established.

9. The method according to claim 7, wherein the shared memory is further used as a control channel, the control channel comprises a first data bit and a second data bit, and states of the first data bit and the second data bit are controlled by the first agent module and the second agent module;

before the outputting, by the first apparatus, a first inter-core interrupt to a core in which the second apparatus is located, the method further comprises:

controlling, by the first agent module, the first data bit to be in a set state and the second data bit to be in a non-set state; and the outputting, by the first agent module, the first inter-core interrupt to the core in which the second apparatus is located comprises:

when the first agent module determines that the first data bit of the control channel between the first application and the second application is in the set state and the second data bit is in the non-set state, outputting, by the first agent module, the first inter-core interrupt to the core in which the second apparatus is located.

10. The method according to claim 9, wherein the obtaining, by the second agent module, the first command from the first command queue based on the first inter-core interrupt comprises:

traversing, by the second agent module based on the first inter-core interrupt, control channels associated with all applications corresponding to the second agent module on the second apparatus; and when determining that the first data bit of the control channel between the first application and the second application is in the set state, obtaining, by the second agent module, the first command from the first command queue.

11. The method according to claim 9, wherein after the running, by the second apparatus, the second application based on the identifier that is of the second application and that is in the first command, the method further comprises:

controlling, by the second agent module, the first data bit of the control channel between the first application and the second application to be in the non-set state and the second data bit to be in the set state;

for the control channel between the first application and the second application, after the second application finishes running, when determining that the first data bit of the control channel is in the non-set state, controlling, by the second agent module, the second data bit of the control channel to be in the non-set state; and when determining that the first data bit of the control channel is in the set state, re-obtaining, by the second agent module, a command from the first command queue, and scheduling, based on an identifier of the second application in the newly obtained command, the second application to be run.

12. The method according to claim 6, wherein when the first apparatus is the physical machine and the second apparatus is the virtual machine, the first apparatus further comprises an authentication module and a first process module, and the determining, by the second agent module based on the first command, whether the second application has permission to access the shared memory comprises:

forwarding, by the second agent module, the identifier that is of the second application and that is in the first command to the first process module on the first apparatus;

determining, by the first process module, an authentication identifier corresponding to the identifier of the second application, and sending a permission information obtaining request to the authentication module, wherein the permission information obtaining request comprises the authentication identifier;

receiving, by the first process module, permission information of the second application from the authentication module, and transmitting the permission information to the second agent module; and determining, by the second agent module based on the permission information of the second application, whether the second application has the permission to access the shared memory.

13. An inter-application communication apparatus for use in an electronic device, the electronic device running a first apparatus and a second apparatus, one of the first apparatus or the second apparatus is a virtual machine and the other is a physical machine, the inter-application communication apparatus comprising:

a memory storing instructions; and at least one processor in communication with the memory, the at least one processor configured, upon execution of the instructions, to perform the following steps:

writing a first command into a first command queue based on a first request sent by a first application, the first request and the first command comprising an identifier of a second application on the second apparatus;

outputting a first inter-core interrupt to a core in which the second apparatus is located so the second apparatus is capable of obtaining the first inter-core interrupt;

obtaining the first command from the first command queue based on the first inter-core interrupt; and running the second application based on the identifier that is of the second application and that is in the first command.

14. The apparatus according to claim 13, wherein the first apparatus further comprises a first agent module, and the writing, by the first apparatus, the first command into the first command queue based on the first request sent by the first application comprises:

receiving, by the first agent module, the first request sent by the first application; and writing, by the first agent module, the first command into the first command queue based on the first request; and the outputting, by the first apparatus, the first inter-core interrupt to the core in which the second apparatus is located comprises:

outputting, by the first agent module, the first inter-core interrupt to the core in which the second apparatus is located.

15. The apparatus according to claim 13, wherein the second apparatus further comprises a second agent module, and the obtaining, by the second apparatus, the first command from the first command queue based on the first inter-core interrupt comprises:

obtaining, by the second agent module, the first command from the first command queue based on the first inter-core interrupt; and the running, by the second apparatus, the second application based on the identifier that is of the second application and that is in the first command comprises:

running, by the second agent module, the second application based on the identifier that is of the second application and that is in the first command.

16. The apparatus according to claim 14, wherein the first request and the first command further comprise blocking information of the first application; and after the receiving, by the first agent module, the first request sent by the first application, the method further comprises:

entering, by the first application, a blocked state;

when receiving a second inter-core interrupt, obtaining, by the first agent module, a second command from a second command queue based on the second inter-core interrupt, wherein the second inter-core interrupt is generated after the second application finishes running; and releasing, by the first agent module, the blocked state of the first application when the second command comprises an identifier of the first application.

17. The apparatus according to claim 16, wherein after the running, by the second apparatus, the second application based on the identifier that is of the second application and that is in the first command, the method further comprises:

after the second application finishes running, receiving, by the second agent module, a second request sent by the second application, wherein the second request comprises the identifier of the first application;

writing, by the second agent module, the second command into the second command queue based on the second request, wherein the second command comprises the identifier of the first application; and outputting, by the second agent module, the second inter-core interrupt to a core in which the first apparatus is located, so that the first apparatus is capable of obtaining the second inter-core interrupt.

18. The apparatus according to claim 14, wherein the writing, by the first agent module, the first command into the first command queue based on the first request comprises:

determining, by the first agent module based on the first request, whether the second application has notification permission; and writing, by the first agent module, the first command into the first command queue when the second application has the notification permission.

19. The method according to claim 16, wherein before the writing, by the first apparatus, a first command into a first command queue based on a first request sent by a first application, the method further comprises:

creating, by the first apparatus, a shared memory in response to a request of the first application, and establishing, by the first agent module, an association relationship between an address of the first application and an address of the shared memory, wherein the first request and the first command further comprise a parameter of the shared memory; and the releasing, by the first agent module, the blocked state of the first application when the second command comprises an identifier of the first application comprises:

when the second command comprises the identifier of the first application and information indicating that a channel is successfully established, releasing, by the first agent module, the blocked state of the first application.

20. A non-transitory computer-readable media storing computer instructions for an inter-application communication for use in an electronic device, the electronic device comprising a first apparatus and a second apparatus, one of the first apparatus or the second apparatus is a virtual machine and the other is a physical machine, wherein the computer instructions configure at least one processor, upon execution of the instructions, to perform the following steps:

writing, by the first apparatus, a first command into a first command queue based on a first request sent by a first application, wherein the first request and the first command comprise an identifier of a second application on the second apparatus;

outputting, by the first apparatus, a first inter-core interrupt to a core in which the second apparatus is located, so that the second apparatus is capable of obtaining the first inter-core interrupt;

obtaining, by the second apparatus, the first command from the first command queue based on the first inter-core interrupt; and running, by the second apparatus, the second application based on the identifier that is of the second application and that is in the first command.

\* \* \* \* \*